United States Patent
Chau et al.

(10) Patent No.: US 9,690,972 B1
(45) Date of Patent: Jun. 27, 2017

(54) METHOD AND APPARATUS FOR FINGERPRINT ENCODING, IDENTIFICATION AND AUTHENTICATION

(71) Applicants: Lam Ko Chau, Ottawa (CA);
Aliaksandr Bialiayeu, Gatineau (CA)

(72) Inventors: Lam Ko Chau, Ottawa (CA);
Aliaksandr Bialiayeu, Gatineau (CA)

(*) Notice: Subject to any disclaimer, the term of this patent is extended or adjusted under 35 U.S.C. 154(b) by 0 days.

(21) Appl. No.: 14/977,557

(22) Filed: Dec. 21, 2015

Related U.S. Application Data

(60) Provisional application No. 62/136,070, filed on Mar. 20, 2015, provisional application No. 62/101,108, filed on Jan. 8, 2015.

(51) Int. Cl.
| | |
|---|---|
| *G06F 7/04* | (2006.01) |
| *G06K 9/00* | (2006.01) |
| *G06K 9/20* | (2006.01) |
| *G06T 7/00* | (2017.01) |
| *G06K 9/62* | (2006.01) |
| *H04L 29/06* | (2006.01) |

(52) U.S. Cl.
CPC ..... *G06K 9/00093* (2013.01); *G06K 9/00013* (2013.01); *G06K 9/00073* (2013.01); *G06K 9/2081* (2013.01); *G06K 9/6219* (2013.01); *G06T 7/0081* (2013.01); *H04L 63/0861* (2013.01); *G06T 2207/20021* (2013.01); *G06T 2207/30196* (2013.01)

(58) Field of Classification Search
CPC ............................. G06F 21/32; H04L 63/0861
USPC ........................................ 726/4, 7; 713/186
See application file for complete search history.

(56) References Cited

U.S. PATENT DOCUMENTS

| | | | |
|---|---|---|---|
| 7,327,859 B1 | 2/2008 | Chau | |
| 2003/0035569 A1* | 2/2003 | Chau | G06K 9/00087 382/124 |

(Continued)

OTHER PUBLICATIONS

A Structural Approach to Fingerprint Classification, Dario Maio and Davide Maltoni, Corso di Laurea in Science dell'Informazione, Università di Bologna, 1015-4651/96, 1996 IEEE, Proceedings of ICPR '96, pp. 578 to 585.

(Continued)

*Primary Examiner* — Saleh Najjar
*Assistant Examiner* — Peiliang Pan
(74) *Attorney, Agent, or Firm* — Wolf, Greenfield & Sacks, P.C.

(57) ABSTRACT

Computer-readable media tangibly embodying computer-readable instructions stored in a memory and executable by a processor of a computer, wherein execution of the computer-readable instructions cause the computer processor to implement a method of encoding a fingerprint. The method comprises acquiring an image of a finger of a user; identifying a set of minutia points in the image; generating a code by a transformation of the minutia points, the transformation including: (i) creating a matrix from features of the minutia points; (ii) obtaining characteristic invariants of the matrix; and (iii) the code being formed based on the characteristic invariants of the matrix; and outputting the code in association with the user or the finger. The characteristic invariants may be the eigenvalues of the matrix.

20 Claims, 23 Drawing Sheets

(56) References Cited

U.S. PATENT DOCUMENTS

| | | | | |
|---|---|---|---|---|
| 2006/0104484 A1* | 5/2006 | Bolle | ................ | G06K 9/00885 |
| | | | | 382/115 |
| 2009/0287930 A1* | 11/2009 | Nagaraja | .................. | H04L 9/08 |
| | | | | 713/171 |
| 2010/0332396 A1* | 12/2010 | Etchegoyen | ............ | G06F 21/10 |
| | | | | 705/50 |
| 2013/0159722 A1* | 6/2013 | Goergen | ............ | H04N 1/32144 |
| | | | | 713/176 |
| 2014/0212008 A1* | 7/2014 | Hatcher, II | ......... | G06K 9/00033 |
| | | | | 382/124 |

OTHER PUBLICATIONS

Ward's Hierarchical Clustering Method: Clustering Criterion and Agglomerative Algorithm, Fionn Murtagh and Pierre Legendre, Dec. 13, 2011, pp. 1 to 20.

Biometrics Bulletin, The Biometrics Section, American Statistical Association, vol. 1, No. 1, Feb. 1945, pp. 79 to 83.

Extended Feature Set Training Tool, Compiled Text and Images, Developed by Noblis, Inc., Jun. 2013, pp. 40 and 41.

Fingerprint Classification by Directional Image Partitioning, Raffaele Cappelli, Alessandra Lumini, Dario Maio, Member, IEEE, and Davide Maltoni, IEEE Transactions on Pattern Analysis and Machine Intelligence, vol. 21, No. 5, May 1999.

\* cited by examiner

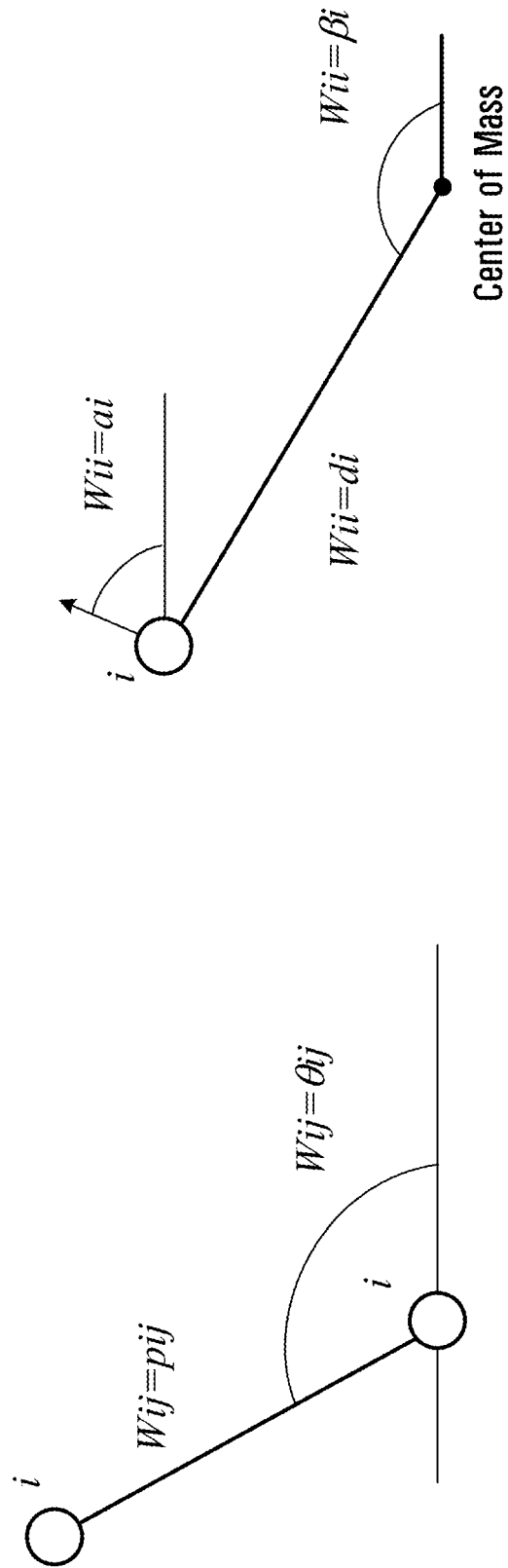

METHOD AND APPARATUS FOR FINGERPRINT ENCODING, IDENTIFICATION AND AUTHENTICATION

CROSS-REFERENCE TO RELATED APPLICATIONS

The present application claims the benefit under 35 USC §119(e) of U.S. Provisional Patent Application Ser. No. 62/101,108, filed Jan. 8, 2015 and U.S. Provisional Patent Application Ser. No. 62/136,070, filed Mar. 20, 2015. Both of the aforesaid applications are hereby incorporated by reference herein.

FIELD

The present invention relates generally to biometric technology and, in particular, to a method and apparatus for fingerprint encoding, identification and authentication.

BACKGROUND

The use of short codes such as passwords and personal identification numbers (PINs) is commonplace for authenticating (confirming the identity of) an individual desiring to access a resource or asset. However, such codes are easily stolen and used by impostors, and therefore provide low security. At the other end of the spectrum, analysis of an individual's unique biometric features does permit high-security identification and authentication, but requires specialized equipment and high processing power, and are non-instantaneous. As a result, most of today's digitally guarded resources and assets continue to rely on technologies that favor speed and simplicity, thus leaving the assets vulnerable to theft or malicious activity. The industry is thus in need of an improved method and apparatus for fingerprint encoding, identification and authentication.

SUMMARY

A first broad aspect of the present invention seeks to provide computer-readable media tangibly embodying computer-readable instructions stored in a memory and executable by a processor of a computer, wherein execution of the computer-readable instructions cause the computer processor to implement a method of encoding a fingerprint, the method comprising:
  acquiring an image of a finger of a user;
  identifying a set of minutia points in the image;
  generating a code by a transformation of the minutia points, the transformation including:
    i. creating a matrix from features of the minutia points;
    ii. obtaining characteristic invariants of the matrix;
    iii. the code being formed based on the characteristic invariants of the matrix;
  writing the code to memory in association with the user or the finger.

A second broad aspect of the present invention seeks to provide a device for fingerprint encoding, comprising:
  an input for acquiring an image of a finger of a user;
  a processor configured for: identifying a minutia map in the image; determining, for each of a set of features of the minutia map, a value of said feature; and generating a code by a transformation of the values of said features, the transformation producing a code that remains the same across multiple different acquired images of the same finger;
  an output for sending the code to a server for storage in association with the user or the finger.

A third broad aspect of the present invention seeks to provide computer-readable media tangibly embodying computer-readable instructions stored in a memory and executable by a processor of a computer, wherein execution of the computer-readable instructions cause the computer processor to implement a method of encoding a fingerprint that comprises:
  causing the computer to acquire an image of a finger of a user further to the finger being scanned by a scanning device;
  causing the computer to identify a set of minutia points in the image;
  causing the computer to determine, for each of a set of features of the minutia points, a value of said feature;
  causing the computer to generate a code by a transformation of the values of said features, the transformation preserving numerical stability of the code across multiple different images of the same finger;
  causing the computer to output the code in association with the user or the finger.

A fourth broad aspect of the present invention seeks to provide a computer-implemented method of authenticating a query user purporting to be a registered user, comprising:
  obtaining an image of a finger of the query user;
  obtaining modification information associated with the query user;
  accessing a memory to obtain a modification rule;
  generating a first code by processing the image in accordance with said modification rule using said modification information;
  accessing the memory to obtain a second code, the second code associated with the registered user;
  comparing the first code with the second code;
  outputting an indication of positive or negative authentication of the query user as the registered user, depending on said comparing.

A fifth broad aspect of the present invention seeks to provide a computer-implemented method of identifying a query user, comprising:
  at a user terminal, obtaining an image of a finger of the query user, the finger being scanned by a scanning device;
  at the user terminal, generating a modified query code by processing the image in accordance with a modification rule using modification information associated with the query user;
  sending the modified query code to an identification/authorization engine;
  at the identification/authorization engine, comparing the modified query code to a plurality of modified reference codes corresponding to respective registered users, thereby to obtain a positive or negative authentication of the query user as one of the registered users;
  outputting an indication of the positive or negative authentication.

A sixth broad aspect of the present invention seeks to provide a computer-implemented method of fingerprint-based identification, comprising:
  obtaining a fingerprint image;
  transforming the fingerprint image into a plurality of transformation space data elements;
  creating a matrix from the plurality of transformation space data elements;
  computing characteristic invariants of the matrix;

determining whether the fingerprint image is positively associated with a known user by comparing certain ones of the characteristic invariants with characteristic invariants previously associated with the known user;

concluding whether the particular known user is associated with the fingerprint image based on the comparing.

A seventh broad aspect of the present invention seeks to provide a computer-implemented method of transforming a fingerprint image into a code, comprising:

obtaining a fingerprint image;

creating a features map from the fingerprint image, the features map containing a certain number N of minutiae;

creating an N×N matrix in which each row and each column corresponds to a particular one of the N minutiae, wherein the diagonal element of a particular row represents a property of the corresponding particular minutia and wherein the off-diagonal element in a certain row and column represents a joint property of the pair of particular minutiae corresponding to the certain row and column;

computing a set of at least one characteristic invariant of the matrix; and setting the code to be a subset of the characteristic invariants.

An eighth broad aspect of the present invention seeks to provide a computer-implemented method of fingerprint-based authentication, comprising:

obtaining an identity of a purported user;

obtaining a fingerprint image from a query user;

transforming the fingerprint image into a set of transformation space data elements;

computing a characteristic invariant representation of the fingerprint image;

comparing the representation of the fingerprint image to a cluster associated with the purported user;

authenticating the query user as the purported user depending on a result of said comparing.

A ninth broad aspect of the present invention seeks to provide a computer-implemented method for deriving a fingerprint code for a user's finger, comprising:

obtaining a fingerprint image of the finger;

segmenting the fingerprint image into a plurality of regions;

deriving a fixed code portion from the segmented fingerprint image, deriving a variable code portion from the segmented fingerprint image;

combining the fixed code portion and the variable code portion into a fingerprint code for the user.

A tenth broad aspect of the present invention seeks to provide a computer-implemented method of authenticating a user who provides a fingerprint code and a fingerprint image, comprising:

deriving a first code portion and a second code portion from the fingerprint code;

segmenting the fingerprint image into a plurality of regions;

deriving a fixed code portion from the segmented fingerprint image;

deriving a variable code portion from the segmented fingerprint image;

confirming authenticity of the user when the first code portion matches the fixed code portion and the second code portion matches the variable code portion or varies to within a predefined tolerance.

An eleventh broad aspect of the present invention seeks to provide a computer-implemented method of authenticating a user who provides a fingerprint code and multiple fingerprint images, comprising:

deriving a first code portion and a second code portion from the fingerprint code;

segmenting each fingerprint image into a plurality of regions;

deriving a fixed code portion from each segmented fingerprint image;

deriving a variable code portion from each segmented fingerprint image;

confirming authenticity of the user when each fixed code portion matches the first code portion and each variable code portion varies with respect to the second code portion by a nonzero amount that is within a predefined tolerance.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 6E shows a possible representation of off-diagonal elements of the matrix of FIG. 6D, in accordance with a non-limiting embodiment.

FIG. 6F shows a possible representation of diagonal elements of the matrix of FIG. 6D, in accordance with a non-limiting embodiment.

It is to be expressly understood that the description and drawings are only for the purpose of illustration of certain embodiments of the invention and are an aid for understanding. They are not intended to be a definition of the limits of the invention.

DETAILED DESCRIPTION

Figure 1A:
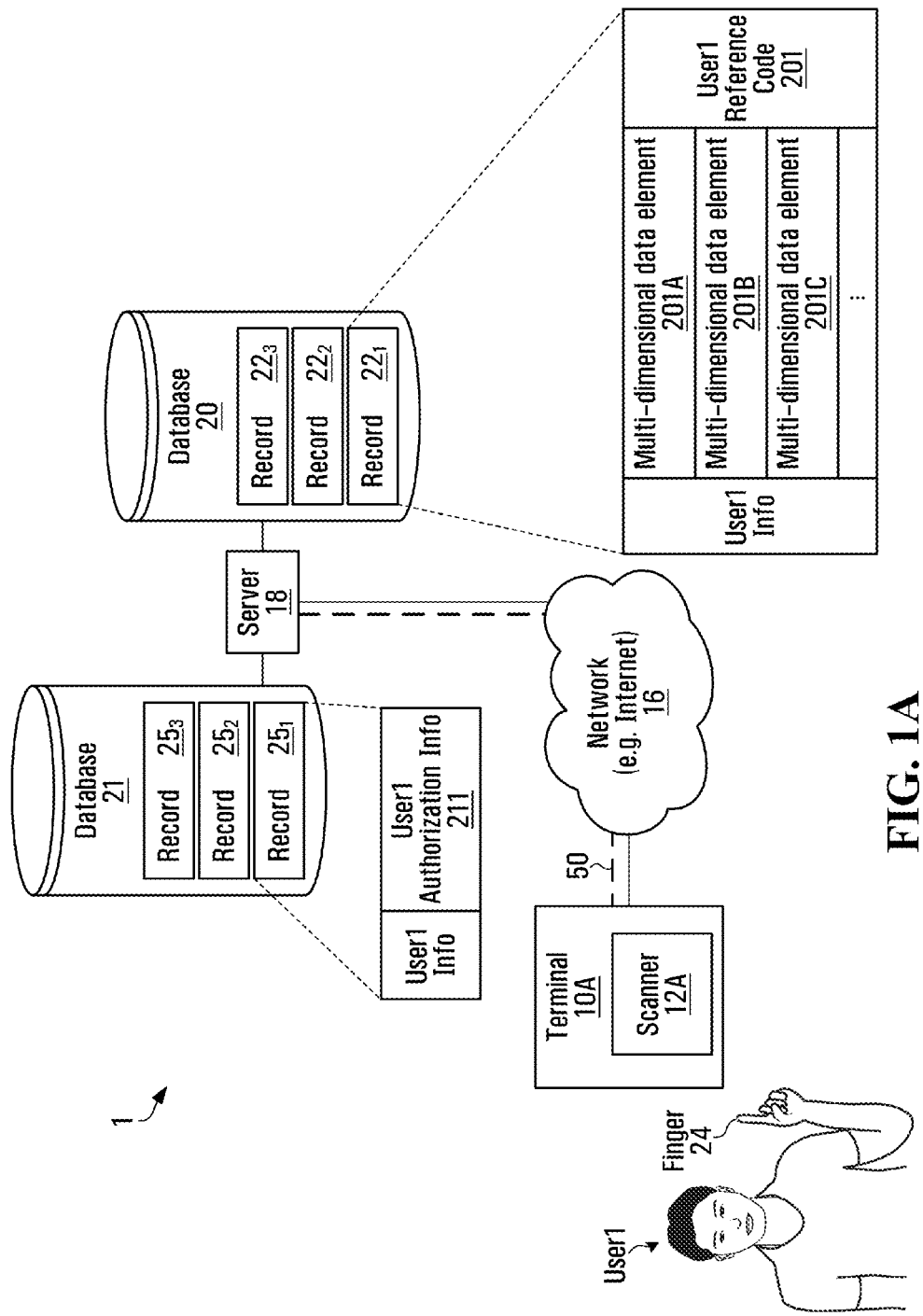
FIGS. 1A and 1B show a system for fingerprint encoding, identification and authentication, particularly during an enrolment phase and an identification phase, respectively, in accordance with a non-limiting embodiment.
Figure 1B:
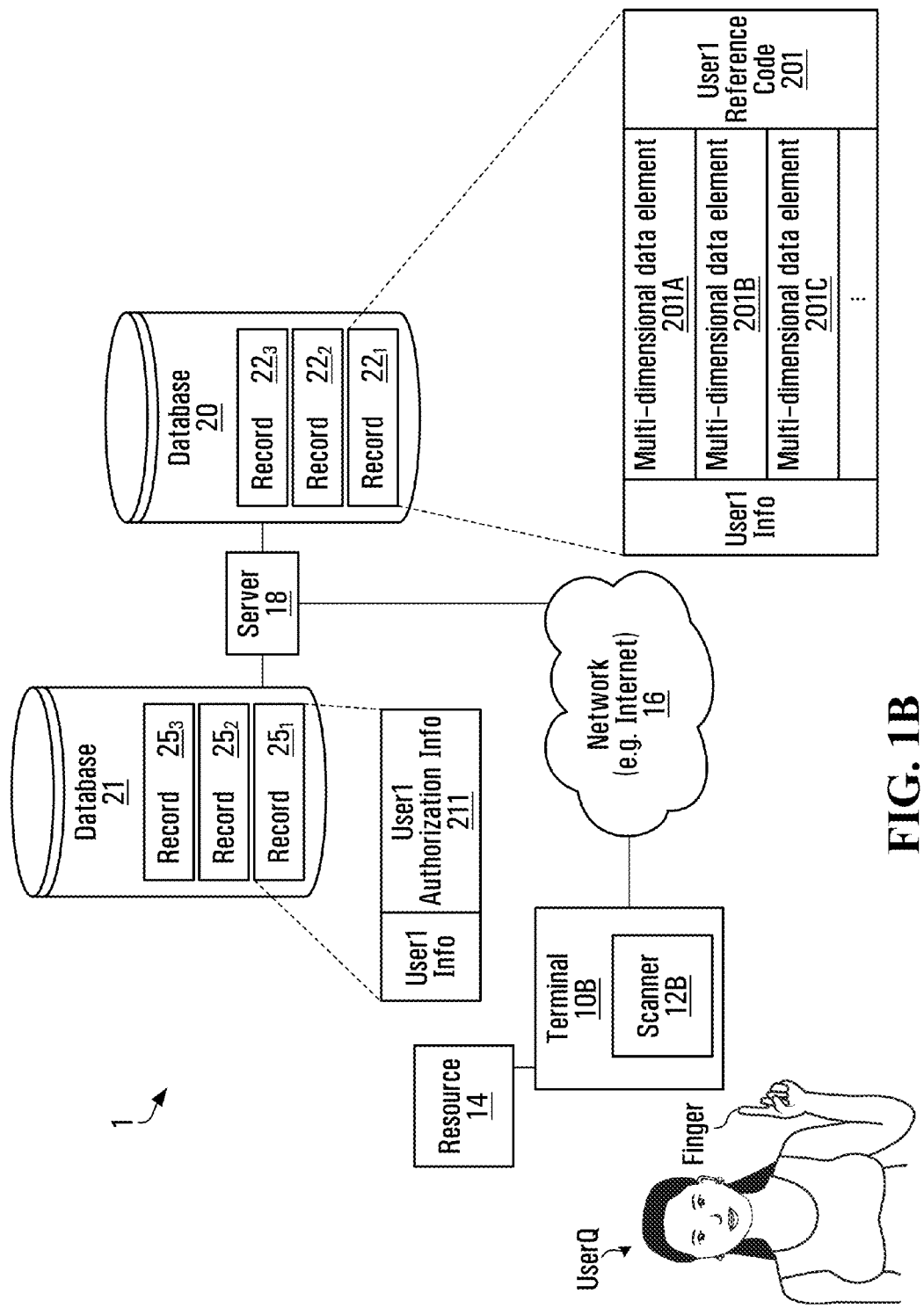

With reference to FIGS. 1A and 1B, there is shown a system 1 for supporting various non-limiting embodiments of the present invention. FIG. 1A shows a terminal 10A used by a user "User1" and pertains to an "enrolment phase" and FIG. 1B shows a terminal 10B used by a user "UserQ" and pertains to an "identification phase". Terminals 10A, 10B are each connected to a server 18 via a network 16 such as the Internet, an intranet or any other computer-based public or private data network. Terminal 10B controls access to a resource 14. The resource 14 may be a physical resource (such as a building, vehicle or cash) or it may be an informational resource (such as medical records, account information, permission to carry out a financial transaction, a software app on a smartphone or tablet, etc.). Non-limiting examples of the terminals 10A, 10B include a mobile device, door access pad, automatic teller machine (ATM), desktop computer or other suitable device. When implemented as a mobile device, the terminals 10A, 10B may include, without being limited to, a cell phone, an MP3 player, a tablet PC, a laptop computer, or a personal digital assistant.

Terminals 10A, 10B communicate with the server 18, which maintains or has access to one or more databases 20, 21. The server 18 and the databases 20, 21 may be implemented or accessible by another server (not shown) that is visible on the web, i.e., a web server. The server 18 may also be a physically instantiated authentication/identification engine and may be referred to as such. Each of the various aforementioned servers and terminals includes a processor and a memory, where the memory stores computer readable instructions that are executable by the processor and which, when executed by the processor, cause the processor to carry out a particular method or function. The various servers and terminals also include input/output circuitry that may be used to connect to one or more external systems, devices, servers or other suitable hardware systems or devices. The processor may be implemented using any suitable hardware component for implementing a central processing unit (CPU) including a microcontroller, field-programmable gate array (FPGA), application-specific integrated circuit (ASIC), digital signal processor (DSP), an integrated circuit (IC) or any other suitable device. The computer readable memory may include any type of non-volatile memory (e.g., flash memory, read-only memory (ROM), magnetic computer storage devices or any other suitable type of memory) or semi-permanent memory (e.g., random access memory (RAM) or any other suitable type of memory). The computer readable memory may also include one or more databases for the storage of data. The processor, the computer readable memory, the scanner 12A/12B and the input/output circuitry may communicate with each other via one or more suitable data communication buses. In various embodiments of the invention, the server 18 and terminals 10A, 10B may implement software, which may operate on a variety of operating systems, such as Android, iOS, Windows 7, Windows 8, Linux and Unix operating systems, to name a few non-limiting possibilities, with the understanding that the software may be adapted to run on operating systems that may be developed in the future.

The database 20 includes a plurality of records for registered users, including a record $22_1$, a record $22_2$ and a record $22_3$. In the illustrated embodiment, record $22_1$ pertains to a certain registered user referred to as "User1" and, as such, includes identification information regarding User 1, referred to as "User1 info" (such as a name, employee ID, credit card number, . . . ), which is stored in the record $22_1$. Records $22_2$ and $22_3$ include similar identification information for other registered users referred to as "User2" and "User3", respectively. Still other records pertaining to other registered users may also be held in the database 20.

For its part, the database 21 includes a plurality of records including a record $25_1$, a record $25_2$ and a record $25_3$. In the illustrated embodiment, record 25 pertains to User1 and, as such, includes the aforementioned identification information regarding User 1 which, it will be recalled, is referred to as "User1 info" (such as a name, employee ID, credit card number, . . . ). The User1 info is stored in the record $25_1$ in association with "authorization info" for User1, denoted 211, such as an indication of one or more resources (e.g., Account1, Account2, . . . ) that User1 is authorized to access. (Alternatively, the authorization info 211 stored in record $25_1$ may pertain to resources that User1 is not authorized to access, or may list different resources together with an indication as to whether, in each case, User1 is or is not authorized to access it, to name a few non-limiting possibilities). Records $25_2$ and $25_3$ include similar identification information and resource access information regarding User2 and User3, respectively. Still other records pertaining to other registered users may also be held in the database 21. In the case of the resource 14, a registered user that is authorized to access the resource 14 will be referred to in the present document as an "authorized" user.

I. Enrollment Phase

With reference to FIG. 1A, terminal 10A may have a trusted/secure link (conceptually shown by reference numeral 50) to the server 18. The trusted/secure link 50 allows for communication between the terminal 10A and the server 18 such that the terminal 10A may transmit messages/information via trusted/secure link 50 which are received at the server 18 and such that the server 18 may transmit messages/information via trusted/secure link 50 which are received at the terminal 10A. The trusted/secure link 50 is used during the enrolment phase, which is assumed to be secure, meaning that a particular user's identity is known by the system 1 when that user wishes to enroll. This can be achieved through a secure Internet link between terminal 10A and the server 18. Alternatively, terminal 10A may be co-located with the server 18, allowing User1 to enroll directly on-site where the server 18 is located. Terminal 10A may implement acquisition hardware, such as a scanner 12A (e.g., a biometric scanner, and in particular a fingerprint scanner). The acquisition hardware of which scanner 12A forms a part may be incorporated into, for example, a mobile phone being used as terminal 10A. Users wishing to register, such as in this case User 1, enroll with the system 1 and to this end may provide one or more fingers to scanner 12A. Depending on how the system 1 is set up, only a single finger may be provided or a plurality of fingers may be provided by each user, either in sequence or simultaneously.

Figure 2:
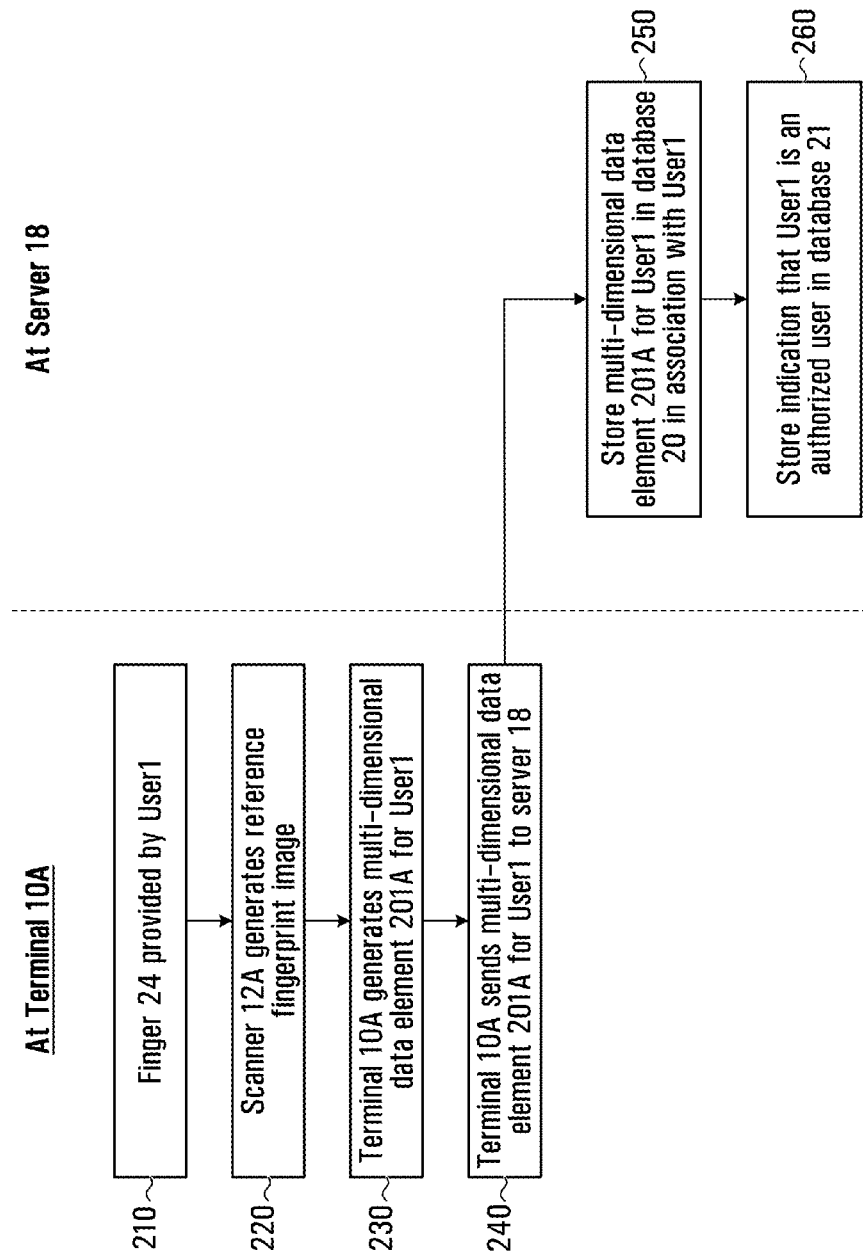
FIG. 2 shows a flowchart illustrating execution of the enrolment phase, in accordance with a non-limiting embodiment.

FIG. 2 shows a sequence of steps that may form part of the enrollment phase. The enrollment phase may be performed for each user whose identity is to be stored in the system (server 18 and databases 20, 21) for eventual identification of that user. For the purposes of this example, it is assumed that the user being enrolled is User1, but it should be understood that the below process can be carried out for other users that may be authorized to access the resource 14 (e.g., User2, User3, . . . ):

At step 210: User1 provides a finger 24 to scanner 12A. Scanner 12A may be a contact scanner (e.g., incorporating a platen or screen) or a non-contact scanner (e.g., a cell phone camera).

At step 220, scanner 12A operates by scanning the finger 24 and generating a reference fingerprint image. This can be done using a variety of techniques known in the art, including light-field and dark-field techniques. The fingerprint image produced may be positive or negative, depending on the embodiment. The image may be two-dimensional or three-dimensional, depending on the embodiment. In some embodiments, the reference fingerprint image may be preprocessed in order to remove noise and normalize it by performing histogram equalization.

At step 230, terminal 10A processes the reference fingerprint image to generate a multi-dimensional data element 201A for User1. Various ways of generating the multi-dimensional data element 201A from the reference fingerprint image will be described further below. The multi-dimensional data element 201A for User1 may have M components (or dimensions), namely $R_1$, $R_2$, . . . , $R_M$. In other words, the multi-dimensional data element 201A for User1 may be M-dimensional.

At step 240, terminal 10A sends the multi-dimensional data element 201A to the server 18. This may be done by packaging the multi-dimensional data element 201A into a message and sending the message over the network 16 over the secure link 50. The message may be encrypted for added security. The server 18, which knows that User1 is in the process of being enrolled, also therefore knows that the multi-dimensional data element 201A received from terminal 10A is to be associated with User 1, and therefore stores the multi-dimensional data element 201A in the database 20 in association with User1. Specifically, record $22_1$, which is populated with the User1 info, is now also populated with the multi-dimensional data element 201A for User1.

It should be appreciated that record $22_1$ may already be populated with other multi-dimensional data elements 201B, 201C, . . . for User1, each of which may have been generated in the past. Moreover, it is envisaged that in addition to populating the record $22_1$ with the multi-dimensional data elements 201A, 201B, 201C, . . . for User1, the record $22_1$ may further populated with the associated time stamp (not shown) when each particular multi-dimensional data element is received at the server 18 (or generated by scanner 12A, etc.). In any event, User1 is considered a "registered user" because the associated record $22_1$ includes at least one multi-dimensional data element, for User1 (namely, in this case, at least multi-dimensional data element 201A).

Consider by way of illustration the specific non-limiting case where the multi-dimensional data elements 201A, 201B, 201C, . . . , for User 1 are mathematically represented in the N-dimensional space (possibly also referred to as a representation in a "the space of characteristic invariants", or a "characteristic invariant representation") by a corresponding set of points 1210. The points 1210 together bound a reference cluster 1220 (or cloud or ellipsoid) for User1. The reference cluster 1220 for User1 will be useful for comparison purposes during the identification phase, described later on.

At step 250, further to receipt of the multi-dimensional data element 201A for User1 at step 240, the reference cluster 1220 for User1 is augmented/updated. In some embodiments, knowledge of the time at which the multi-dimensional data element 201A is received at step 240 (or generated by scanner 12A) may be a factor in augmenting/updating of the reference cluster 1220 for User1. For example, the number of M-dimensional data elements that make up the reference cluster 1220 for User1 may be limited, e.g., to only the P most recent measurements, or to all measurements taken within the last Q days, etc., where P and Q are predetermined values known to the system 1. Other variants are of course possible.

At step 260, assuming that User1 is also an authorized user (i.e., a registered user authorized to access the resource 14), the server 18 stores this information (i.e., that User1 is an authorized user) in record $25_1$ so that User1 is from now on recognized as an authorized user for the resource 14. Of course, this information may be changed over time.

It should be appreciated that the aforesaid generation of the reference fingerprint image and the aforesaid generation of the multidimensional data element 201A (i.e., steps 220 and 230) may be performed while User1's finger 24 remains in position relative to the scanning device 12A. In this way, generation and transmission of the multi-dimensional data element 201A to the server 18 may be the result of tangible interaction of the user with the scanning device 12A.

In a variant, the enrollment phase described above includes a further step whereby the server 18 processes the received multi-dimensional data element 201A for User1 (which was received at step 240) in conjunction with one or more of the prior multi-dimensional data elements 201B, 201C, . . . for User1 to generate a "reference code" for User1, denoted 201. As is the case with multi-dimensional data elements 201A, 201B, 201C, . . . , the reference code for User1 may also have M components (or dimensions). For example, the reference code 201 for User1 may be derived from properties of the reference cluster 1220 for User1, e.g., as a central point 1230 of the reference cluster 1220. Alternatively, the reference code for User 1 may be constructed as a weighted and normalized sum of the multi-dimensional data elements in the reference cluster 1220 for User1, where the weight of a particular point is attributed to the relative age of that point (with more recently acquired measurements being favored, for example). The server 18 may store the reference code 201 for User1 in the database 20 in association with User1. Specifically, record 22$_1$, which is populated with the User1 info and with the multi-dimensional data elements for User1, may now be further populated with the reference code 201 for User1.

II. Identification Phase

With reference to FIG. 1B, terminal 10B may include acquisition hardware, such as a scanner 12B (e.g., a biometric scanner, and in particular a fingerprint scanner). The acquisition hardware of which scanner 12B forms a part may be incorporated into, for example, a mobile phone being used as terminal 10B. A query user, referred to as UserQ, and who may or may not be one of the registered users (User1, User2, User3, . . . ), may seek to access the resource 14 and to this end provide one or more fingers to the scanner 12B. The query user UserQ may provides a single finger or a plurality of fingers, either in sequence or simultaneously, depending on the requirements of the system 1. One possible goal of the system 1, in an embodiment, could be to determine whether the query user UserQ is an authorized user, i.e., a registered user having the appropriate permission/credentials to access the resource 14, as per the information specified in database 21.

Accordingly, during the identification phase, UserQ attempts to log in to access the resource 14. For the purposes of simplicity, it is assumed that User1, User2 and User3 are the only "authorized users", i.e., the only registered users authorized to access the resource 14. As such, the system 1 needs to determine whether UserQ is one of User1, User2 or User3 and, if so, to authorize UserQ to access the resource 14. To accomplish this task, the identification phase is broken down into a front end and a back end. The front end of the identification phase is performed by terminal 10B, whereas the back end of the identification phase is performed by the server 18. The communication channel (unnumbered) between terminal 10B and the server 18 via the network 16, which is not necessarily secure, allows for the communication (e.g., transmission and/or reception) of messages/information between terminal 10B and the server 18.

Figures 3A, 3B:
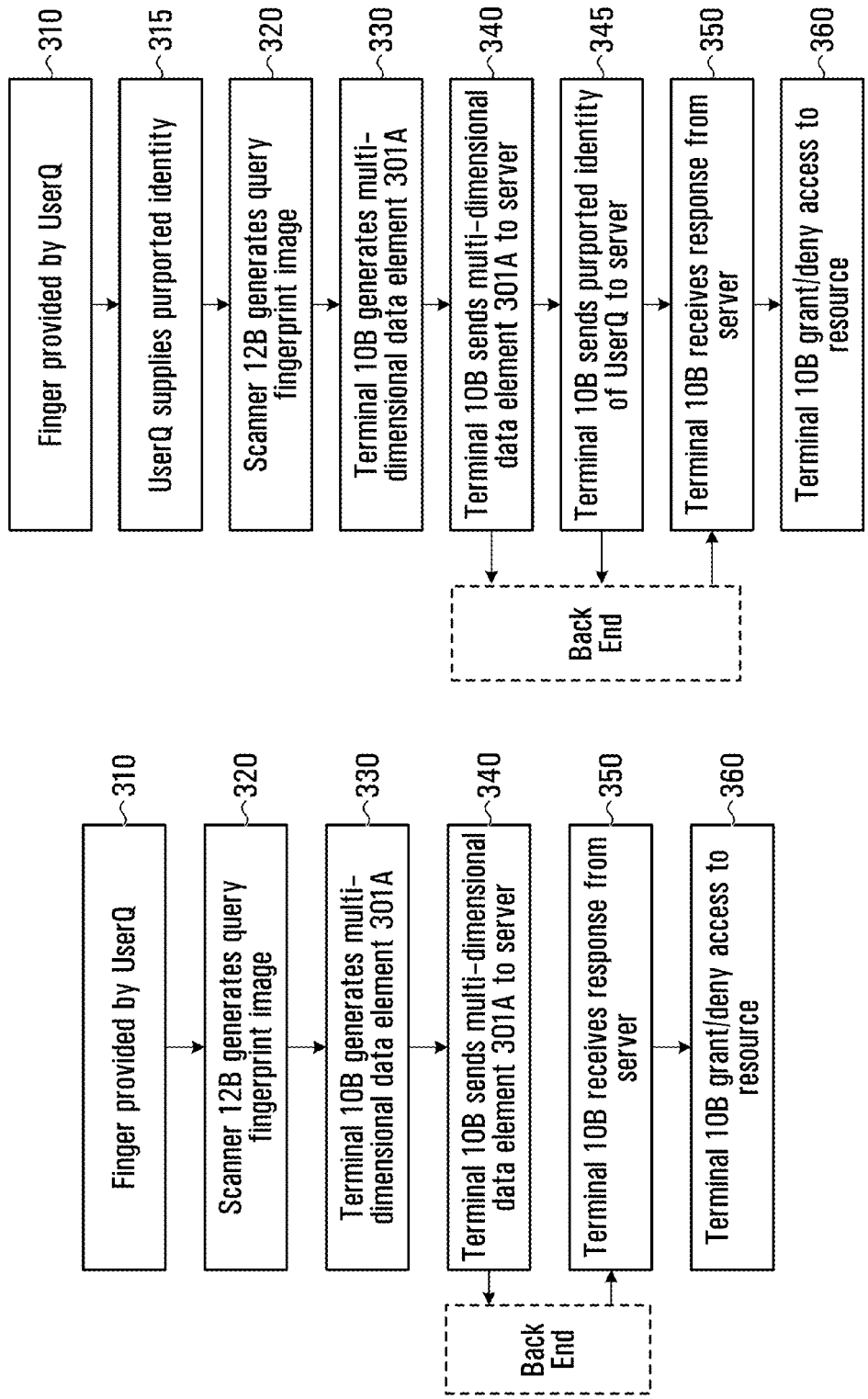
FIG. 3A shows a flowchart illustrating execution of a front end of the identification phase by a terminal, in accordance with a non-limiting embodiment.
FIG. 3B shows a flowchart illustrating execution of a front end of the identification phase by a terminal, in accordance with another non-limiting embodiment.

FIG. 3A shows a sequence of steps that may form the front end of the identification phase.

At step 310, UserQ provides a finger to scanner 12B. It is assumed that UserQ knows which finger to provide or is instructed to do so, although this is not a requirement. Scanner 12B may be a contact scanner (e.g., incorporating a platen or screen) or a non-contact scanner (e.g., a cell phone camera). Scanner 12B need not be scanner 12A nor similar to it.

At step 320, scanner 12B operates by scanning the finger provided at step 310 and generating a query fingerprint image. This can be done using a variety of techniques known in the art, including light-field and dark-field techniques. The fingerprint image produced may be positive or negative, depending on the embodiment. The image may be two-dimensional or three-dimensional, depending on the embodiment. In some embodiments, the query fingerprint image may be preprocessed in order to remove noise and normalize it by performing histogram equalization.

At step 330, terminal 10B processes the query fingerprint image to generate a multi-dimensional data element 301A for UserQ (whose identity is still unknown). Different ways of generating the multi-dimensional data element 301A from the query fingerprint image will be described further below. The multi-dimensional data element 301A may have M components (or dimensions), namely $Q_1, Q_2, \ldots, Q_M$. In other words, the multi-dimensional data element 301A may be M-dimensional.

At step 340, terminal 10B sends the multi-dimensional data element 301A to the server 18. This may be done by a processor in terminal 10B causing the transmission of a message to the server 18 over a network interface. The back end of the identification process then executes, as described herein below.

At step 350, terminal 10B obtains a response from the server 18 that may indicate the identity of UserQ and/or provide an indication as to whether access to the resource 14 has been granted or denied by the server 18.

At step 360, terminal 10B accordingly grants/denies UserQ access to the resource 14. Granting of access can be done in numerous ways such as sending a message to an access controller, which may issue a control signal to activate/deactivate a relay, issuing an acceptable password, etc. Depending on the embodiment, denial of access may simply be the avoidance of taking action or may itself involve taking an action to specifically disable access to the resource 14.

Figures 4A, 4B:
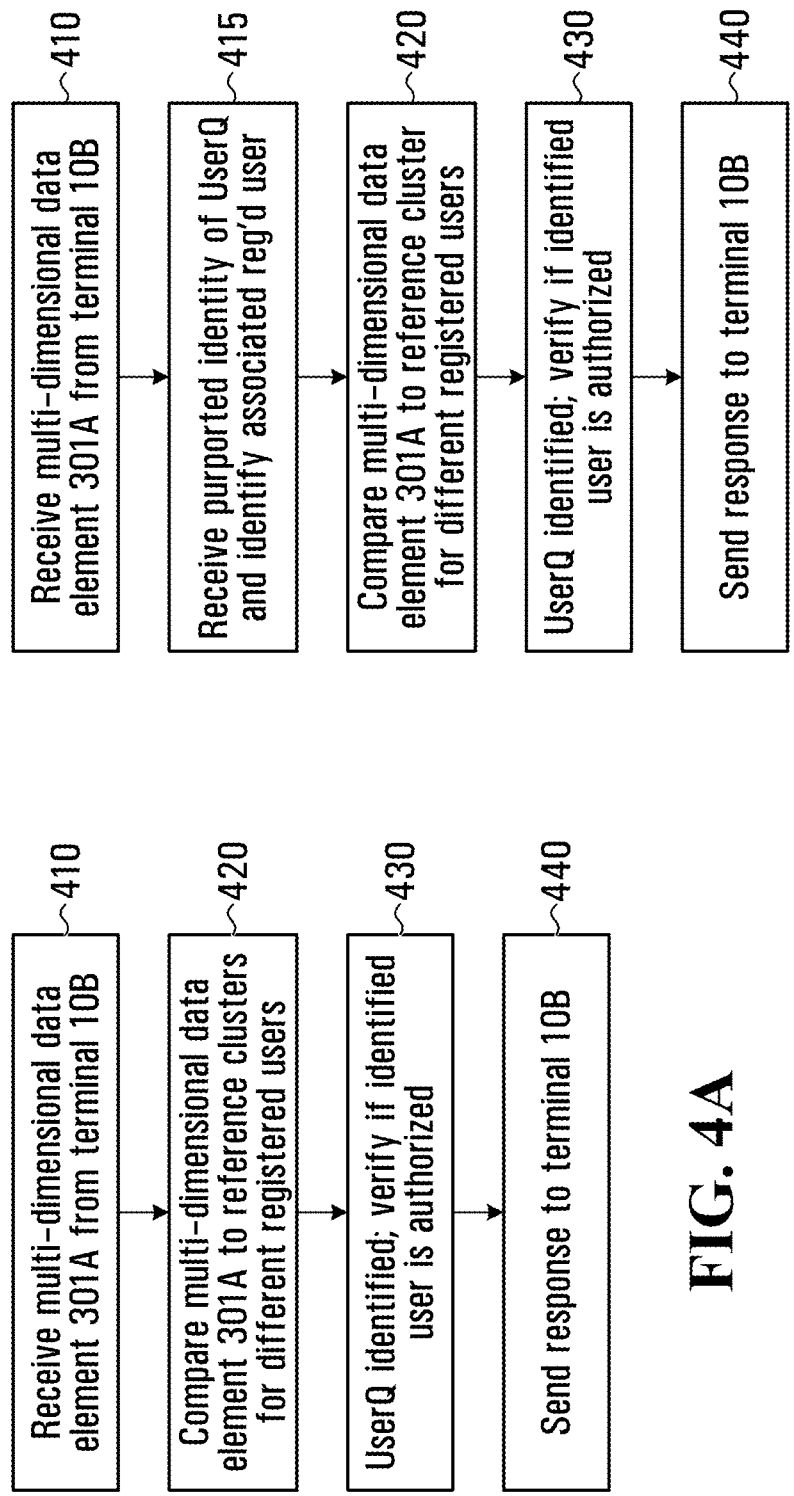
FIG. 4A shows a flowchart illustrating execution of a back end of the identification phase by a server, in accordance with a non-limiting embodiment.
FIG. 4B shows a flowchart illustrating execution of a back end of the identification phase by a server, in accordance with another non-limiting embodiment.

FIG. 4A shows a sequence of steps that forms the back end of the identification phase. This part of the identification phase may be implemented by or with the assistance of the server 18.

At step 410, the server 18 receives a message containing the multi-dimensional data element 301A from terminal 10B.

At step 420, the server 18 compares the multi-dimensional data element 301A to reference clusters for different registered users, some of which are authorized users of the resource 14 (as is the case with reference cluster 1220 for User1, which was described previously). The comparison may include a determination of whether the multi-dimensional data element 301A falls "inside" the cluster (or cloud or ellipsoid) for a given user. In some cases, the comparison may involve assessing distance criteria (e.g., Euclidean distance) between the multi-dimensional data element 301A and the reference code that was derived from each user's cluster.

Figure 13:
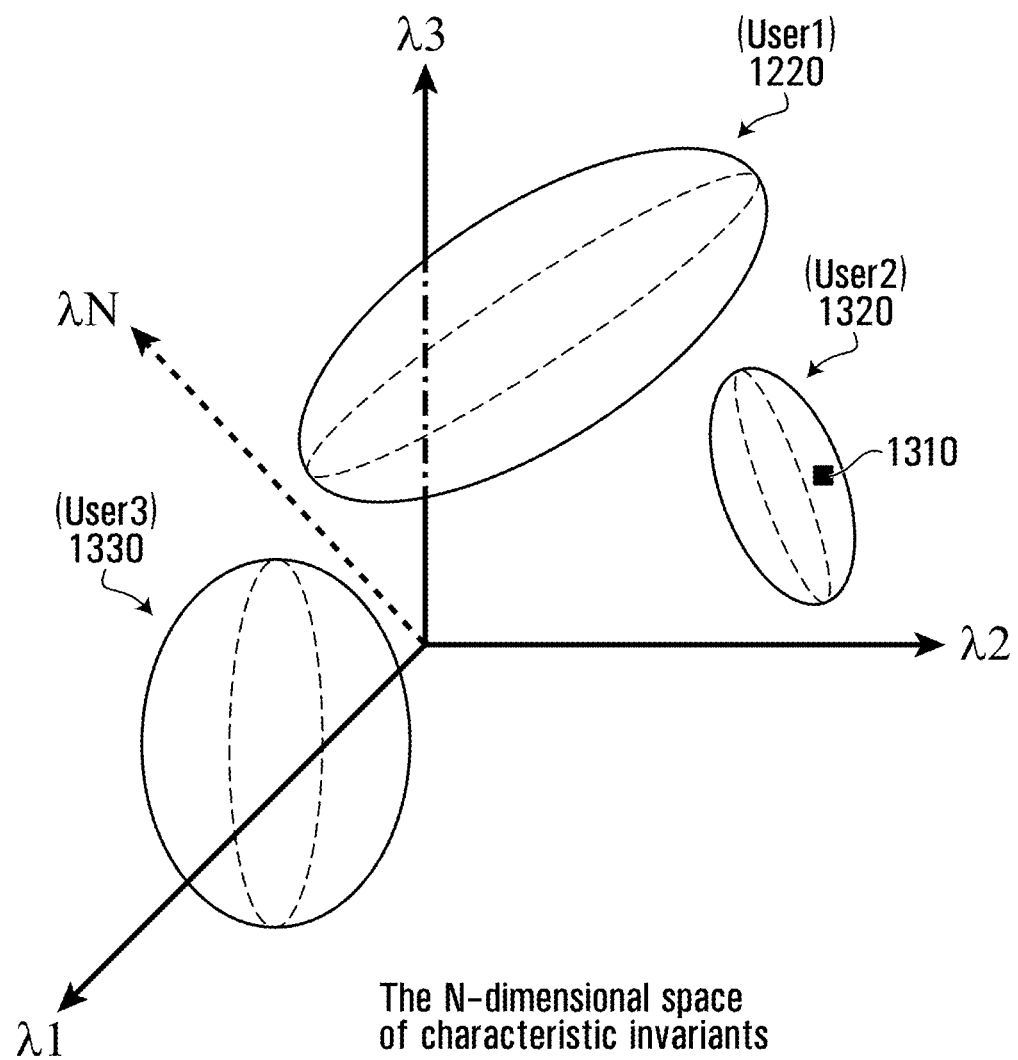
FIG. 13 shows a data element relative to the location of a plurality of clusters in the space of characteristic invariants.

FIG. 13 shows the illustrative case of the multi-dimensional cluster 1220 for User1, as well as clusters 1320 for User2 and cluster 1330 for User3. (More generally, however, it will be understood that the clusters 1220, 1320, 1330 exist in a multi-dimensional space where the number of dimensions may be greater than three. The multi-dimensional data element 301A is represented by a data element point 1310 in a multi-dimensional space (which may be referred to as the "space of characteristic invariants"). As such, the comparison at step 420 (when performed for User1) may involve an assessment of whether the data element point 1310 falls "inside" the 3-dimensional cluster 1220, inside cluster 1320 or inside cluster 1330. Now consider that the identity of UserQ is not known. In this case, the outcome of step 420 may be a "similarity parameter" that represents the "distance" between the data element point 1310 and each of the reference clusters 1220, 1320, etc., stored in the record for each registered user. The distance metric used may be a Euclidean distance to the closest surface of the smallest possible ellipsoid encompassing the cluster (hereinafter the "reference ellipsoid"), a distance to the "center of mass" (or central point) of the cluster, or any other suitable measure. If the data element point 1310 lies "inside" the reference cluster corresponding to a particular finger of a particular user (e.g., the distance from the data element point 1310 to the central point of the reference ellipsoid of a particular user does not exceed the threshold values along each of the principal axes of the reference ellipsoid's covariance matrix), then the particular user and the particular user's finger are deemed to have been positively identified. It is noted that comparisons with different reference clusters can be done in series or in parallel, depending on the implementation and the availability of computational resources.

At step 430, in the case where the query user UserQ has been identified as a particular registered user (for the sake of example, as per FIG. 13, let this be User2, corresponding to cluster 1320), the server 18 may determine whether the identified registered user (in this case, User 2) is an authorized user for the resource 14. This can be achieved by consulting the database 21 and, in particular, record 25$_2$ for User 2. In another embodiment, the comparison carried out earlier at step 420 may be limited to authorized registered users, so as to avoid a second comparison at step 430.

At step 440, based on the comparisons of steps 420 and 430, in the case where the query user UserQ has been identified as a particular authorized registered user, the server 18 may output the identity of such authorized registered user or may output the simple fact that there has been a match (without supplying the authorized registered user's identity). A level of confidence in such determination may be supplied. This level of confidence may be representative of the magnitude of the distance computed at the comparison steps 420, 430. The output is sent back to terminal 10B as a response signal or message, which may include the identity of the authorized registered user that has been identified (in case such identification was positive) and/or a simple indication of whether UserQ is authorized to access the resource 14.

Those skilled in the art will appreciated that when step 420 reveals that the multi-dimensional data element 301A falls within the reference cluster/ellipsoid for a particular identified registered user, it is possible to update the points from which that reference cluster was computed. (For example, it is recalled that the reference cluster 1220 for User1 was derived from a set of slightly varying multi-dimensional data elements, namely, multi-dimensional data elements 201A, 201B, 201C, . . . ). The reference cluster for the identified registered user may be augmented/updated to include the multi-dimensional data element received from terminal 10B. Alternatively, the set of multi-dimensional data elements used to construct the reference cluster for the identified registered user, which may be limited to contain a certain number of such data elements, may be enhanced to replace the oldest of the data elements with the multi-dimensional data element received from terminal 10B. In this way, the reference cluster is limited to a certain number of samples being the "freshest" samples, or where samples older than a certain expiry date can be assigned a smaller weight. Thus, older samples are attributed a weight that diminishes as age of the sample increases. In other embodiments, the oldest samples may even be removed from the set past a certain age. Here too, as previously described in regard to the enrollment process, a time stamp may be stored with each multi-dimensional data element that is added to the set of multi-dimensional data elements from which the reference cluster is generated. This information is stored in the database 20.

FIGS. 3B and 4B are variants of FIGS. 3A and 4A respectively, in which, rather than identification, the system performs authentication. For example, in FIG. 3B, an additional step 345 is included as part of the front end of the identification phase wherein terminal 10B sends to the server 18 a message comprising the purported identity of UserQ. The purported identity of UserQ is obtained at step 315 e.g., by having UserQ supply a bank card or user ID. In FIG. 4B, the back end of the identification phase includes an additional step 415, whereby the server 18 receives a message containing the purported identity of UserQ and determines whether this information corresponds to the user info of one of the registered users. If so, then the server 18 accesses database 20 so as to select the specific reference cluster corresponding to this registered user, such that the comparison at step 420 is carried out between the multi-dimensional data element 301A and only that specific reference cluster. This may save a considerable amount of computation time, rendering the process more efficient. In this case, the response sent at step 440 need not include the identity of the authorized registered user (since the purported identity of UserQ will have been confirmed), but rather may return a simple indication of whether UserQ is authorized to access the resource 14. This avoids the effort involved in having to identify a registered user associated with a query fingerprint image, as it allows computational resources to be concentrated on comparison with only one reference cluster. Authentication can therefore be performed with less computational intensity, and/or greater precision, than identification.

In an alternative embodiment, the identity of which finger is involved in the comparisons (e.g., thumb, index, etc.) may also be supplied.

In an alternative embodiment, the multi-dimensional data elements 201A and 301A are created at the server 18 rather than at the terminals 10A, 10B. Thus, once the respective scanner 12A, 12B has acquired the fingerprint image, this image is sent to the server 18 by terminal 10A (through a trusted channel) and terminal 10B without further processing. In this way, steps 230 and 330 are carried out by the server 18.

III. Generation of a Multi-Dimensional Data Element from a Fingerprint Image (for Enrollment Phase and Identification Phase)—Characteristic Invariants Approach The following describes various ways of creating the multi-dimensional data element 201A (see step 230, above) and the multi-dimensional query code 301A (see step 320, above). It will be appreciated that according to this embodiment, the data element derived from a server fingerprint image remains numerically stable or even constant, even if the fingerprint image is perturbed. This may be achieved through the use of characteristic invariants which, in a non-limiting embodiment, may include singular values, eigenvalues and combinations thereof, or any other matrix invariants.

Figure 5:
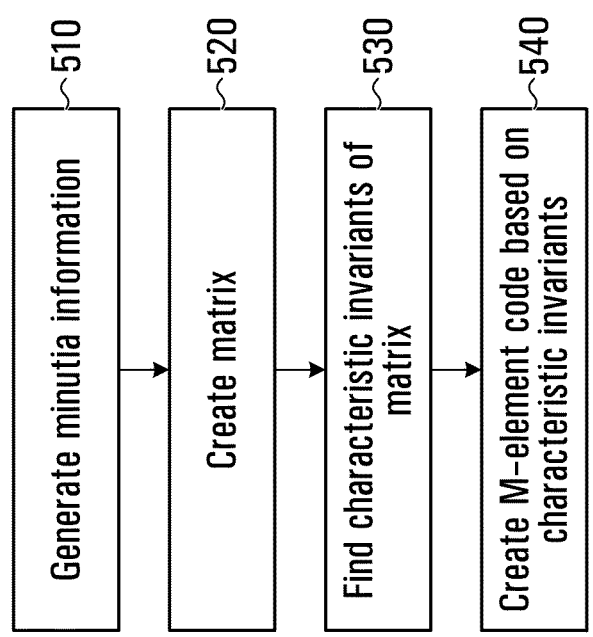
FIG. 5 shows steps in generation of a code from a fingerprint image, in accordance with a non-limiting embodiment.

With reference now to FIG. 5, there is shown a flowchart for use in a specific non-limiting embodiment. For the purposes of this description, it is not important whether the data element being generating is the multi-dimensional data element 201A or the multi-dimensional data element 301A. It is simply referred to as a "code". Also, the entity that is implementing the method can be terminal 10A in some embodiments and terminal 10B in other embodiments, and in still other embodiments it can be the server 18. To keep the description general, this code generating entity will be referred to as a "processor", such as a central processing unit of a computing device.

At step 510, the processor generates "topological" features from the fingerprint image. A specific non-limiting example of features includes a plurality of minutia points and their Cartesian coordinates within a two-dimensional map (Cartesian plane). In some embodiments, the orientation of the Cartesian plane relative to other finger features of the fingerprint image is to be preserved, while in other embodiments the orientation of the Cartesian plane is not important. Other types of features may be extracted from the fingerprint image.

Figure 6A:
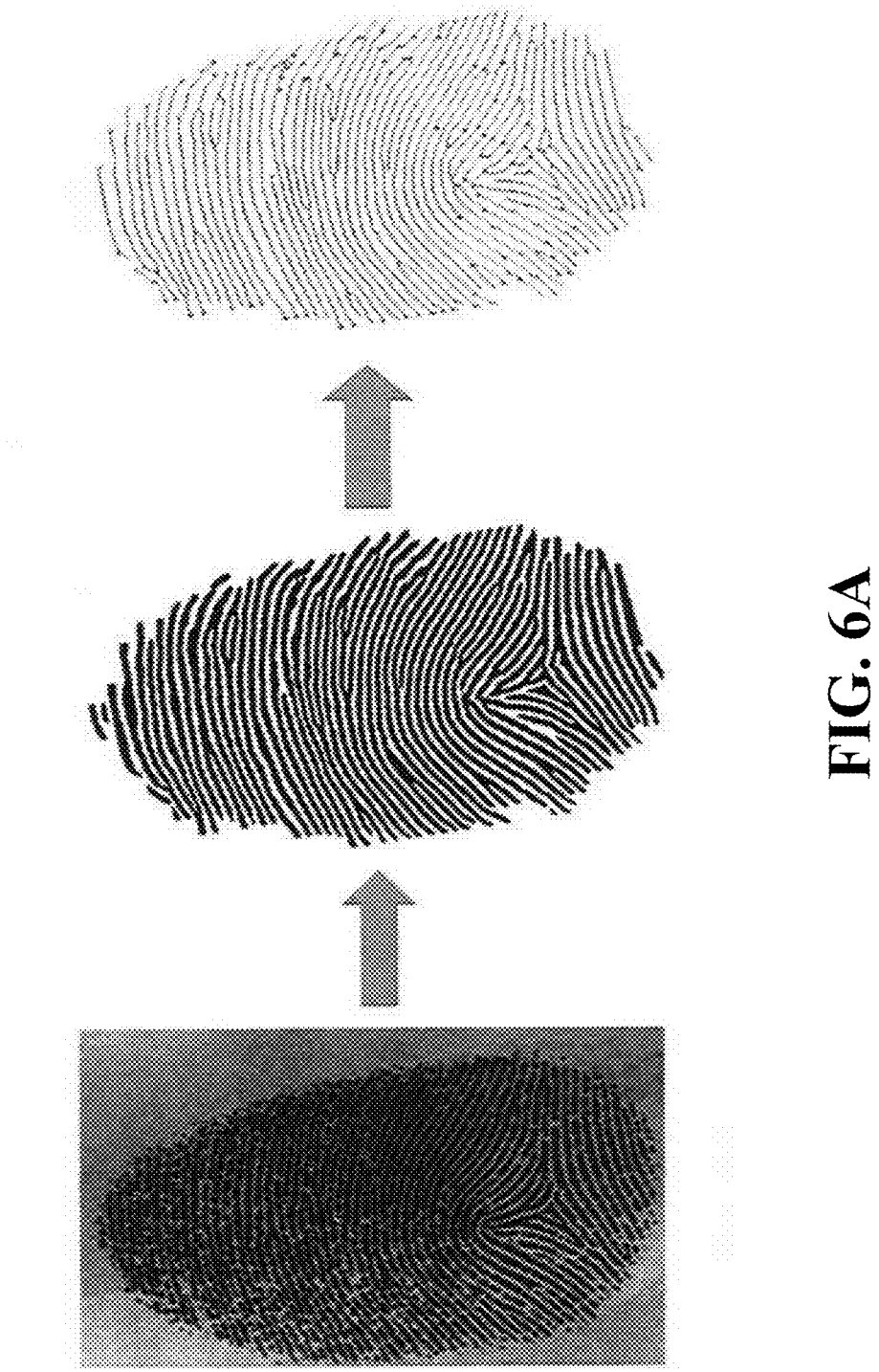
FIG. 6A shows an example fingerprint image before and after ridge extraction, in accordance with a non-limiting embodiment.
Figure 6B:
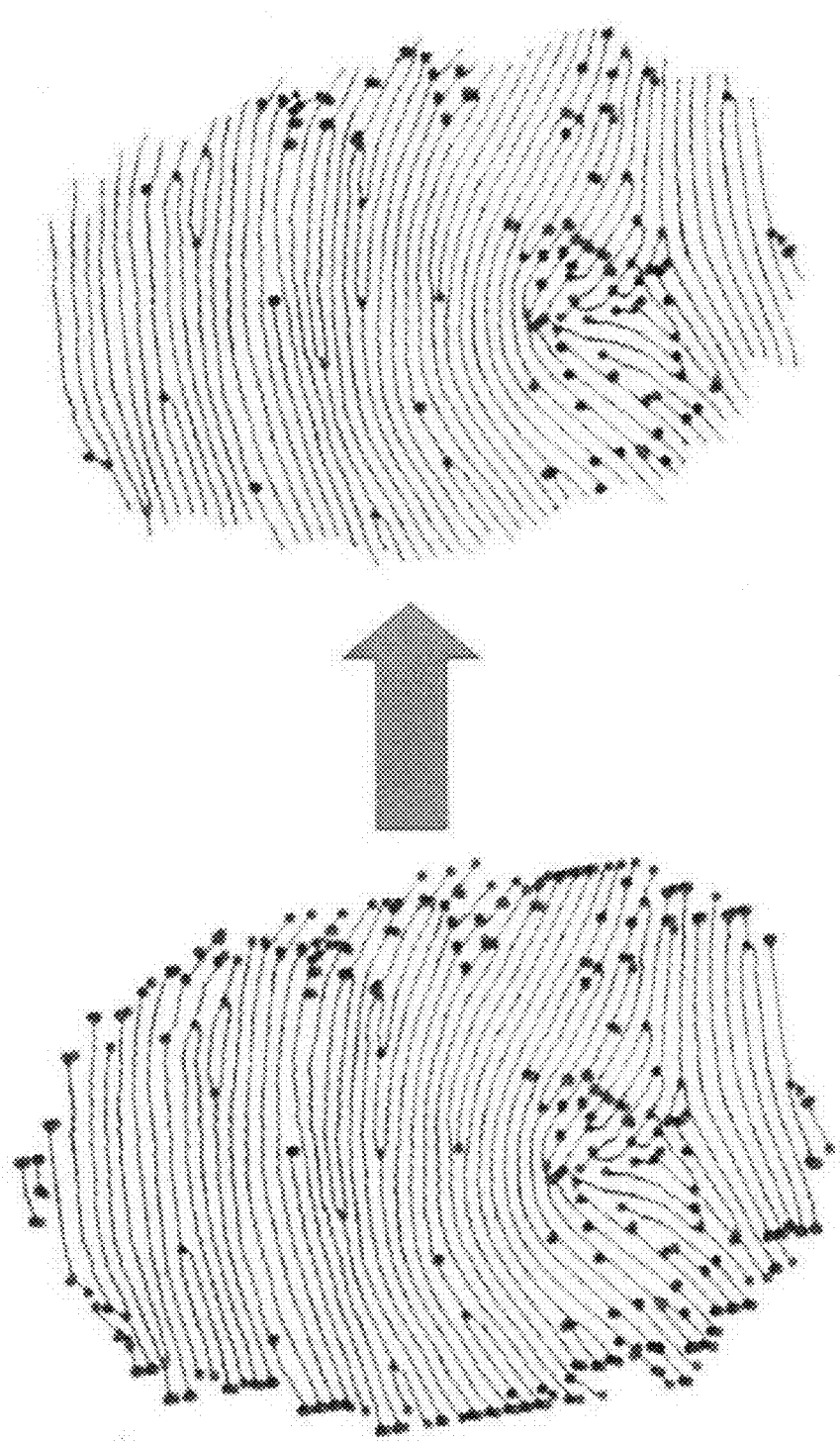
FIG. 6B shows minutia points in the fingerprint image of FIG. 6A, before and after removal of falsely detected minutiae, in accordance with a non-limiting embodiment.

In one embodiment, pre-processing is also performed. Specifically, the processor may perform ridge extraction, which can be achieved with the help of Gabor filters, for example. FIG. 6A shows the original image received by the server 18 from scanner 12A or scanner 12B (e.g., by receiving a message over the network 16), the fingerprint image after image processing and the fingerprint image after application of a Gabor filter. Then, the processor performs extraction and classification of candidate minutia points, resulting in a unique candidate minutiae map as shown in FIG. 6B. The processor analyzes the candidate minutiae map and automatically removes falsely detected or unstable points, such as points at the fingerprint boundary cause by ridge endings. Such boundary points are considered unstable in the case of a contact scanner because of the variation in pressure applied by the finger as well as the variation in finger roll. The result is no longer a candidate minutiae map, but rather a minutiae map.

At step 520, the processor may create a (2-dimensional) matrix based on the minutiae map determined at step 510. Several non-limiting embodiments of step 520 are possible, two of which will now be described.

Figures 6C, 6D:
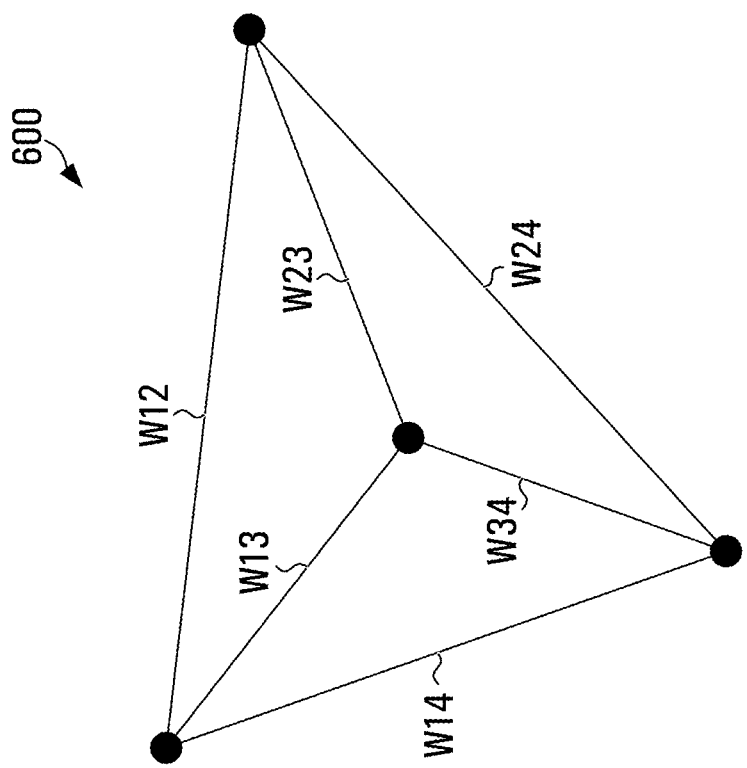
FIG. 6C shows creation of a clique that may be created from a minutia map, in accordance with a non-limiting embodiment.
FIG. 6D shows a matrix that may represent a clique, in accordance with a non-limiting embodiment.

A first such embodiment is now described with reference to FIGS. 6C-6G. Specifically, once the minutiae map has been obtained further to step 510, the processor forms a clique, i.e., a graph in which every vertex is adjacent every other. By way of non-limiting example, FIG. 6C shows a clique 600 formed with 4 minutia points represented by nodes W11, W22, W33 and W44. An edge between node i and node j is represented by a number Wij. This number quantitatively represents the feature. If the feature is edge direction invariant, then Wij=Wji and the matrix is symmetric.

The constructed graph is used by the processor to generate a number of weighted adjacency matrices, with weights characterizing chosen features (angles, etc.). For instance, a distance matrix can be created based on the distance between the minutia points. Alternatively, a matrix may be formed from the relative angles of graph edges, etc. The weights can be divided into two groups, namely the weights assigned to the graph edges and the weights assigned to the graph nodes. In a graph having N nodes, the weights assigned to the graph edges may form the off-diagonal elements of an N×N matrix, while the weights assigned to the graph nodes may form the diagonal elements of the N×N matrix. This is illustrated in FIG. 6D for the case of a 4×4 matrix formed based on the 4 nodes in FIG. 6C.

The weights can represent particular features of the minutiae map. For instance, the off-diagonal weights wij (i not equal to j) can represent, in various non-limiting embodiments:
the distance between minutia points i and j (see $\rho_{ij}$ in FIG. 6E);
where the minutia points i and j are directed minutiae, the difference between the angles of the two minutia points i and j; or
the tilt angle of the edge between minutia points i and j relative to a common reference (see $\theta_{ij}$ in FIG. 6E);
other "joint properties" of minutia points i and j.

As for the diagonal weights, these may represent:
the distance and angle to the central point of the graph (or "center of mass") (see $d_i$ and $\beta_i$ in FIG. 6F);
a numerical code representing the minutia type (such as ending, bifurcation, island, lake, spur, crossover); or
where the minutia point is a directed minutia point, the direction of the minutia point (see $\alpha_i$ in FIG. 6F).

Having constructed an N×N matrix according to this first embodiment, the processor may then proceed to step 530, described below.

Alternatively, a second embodiment of step 520 (creation of a matrix) is now described with reference to FIGS. 7A to 7D. Specifically, the scanned fingerprint image is first aligned and centered.

Figure 7A:
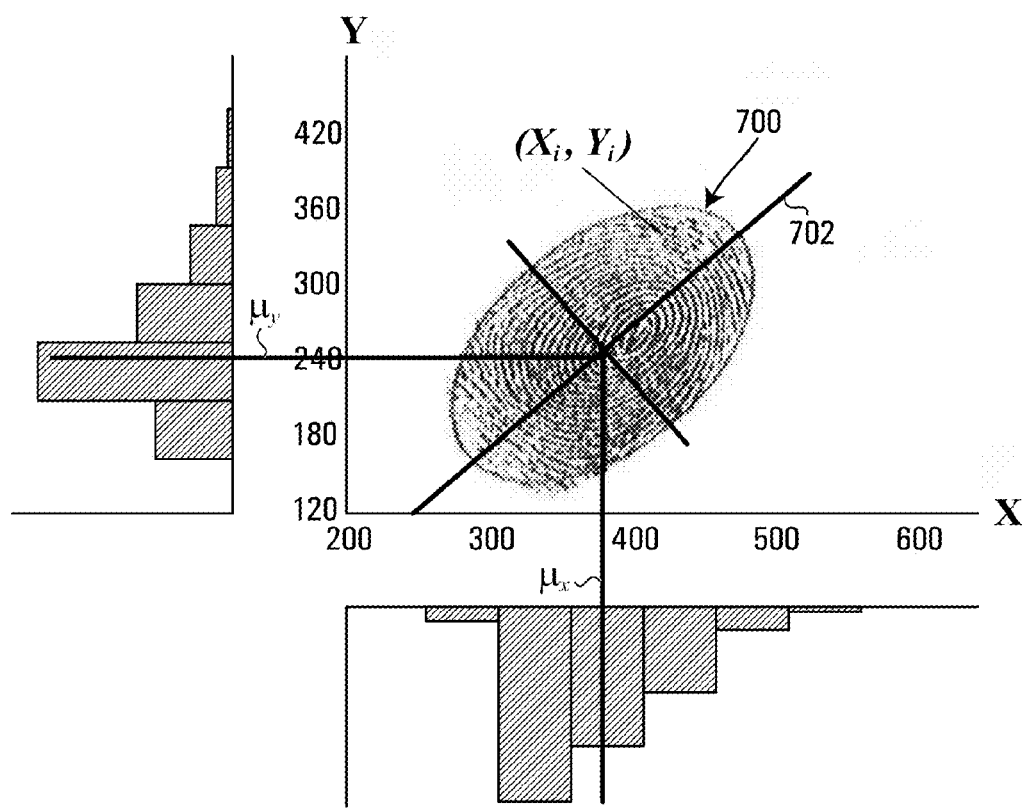
FIG. 7A illustrates central point estimation of a fingerprint image, in accordance with a non-limiting embodiment.

For example, consider that the captured fingerprint image is a set of points defined by X and Y vectors and an intensity vector I. In one example aligning technique, a central point of the image is estimated by computing expectation values along the X and Y axes as shown in FIG. 7A. The elongation of the fingerprint image 700 is considered next to determine the image orientation. An axis of the image, denoted by reference numeral, 702 is chosen along the most variance in the data set. The tilt (angle) of the axis 702, with reference to the initial coordinate system, determines the tilt angle, thus the initial image can be aligned by rotating it in the opposite direction by the value of the tilt angle. Mathematically, the procedure of alignment can be viewed in terms of principal component analysis (PCA) where the covariance matrix C is constructed out of the two data vectors X and Y, and is given by:

$$C = \frac{1}{N}(V - E[V])(V - E[V])^T,$$

where $$V = \begin{pmatrix} X \\ Y \end{pmatrix}$$

is a 2×N matrix, N is the number of elements in the data set (i.e., the number of pixels with a nonzero value), and E(X) is the expectation value of X. The principal vectors and the rotation matrix may be obtained by the method of singular value decomposition of the covariance matrix C.

Other techniques for aligning/centering the fingerprint image may be used. For example, the processor may implement an algorithm for detecting a core and a first flexion crease within the fingerprint image, fitting the flexion crease to a straight line and drawing a second line perpendicular to the first line that passes through the core, thereby to obtain a two-dimensional, orthogonal frame of reference. These two orthogonal axes can be used as the X and Y axes of the frame of reference for the aligned fingerprint image. A centering operation may be performed to ensure that the core is at the origin, for example.

Figure 7B:
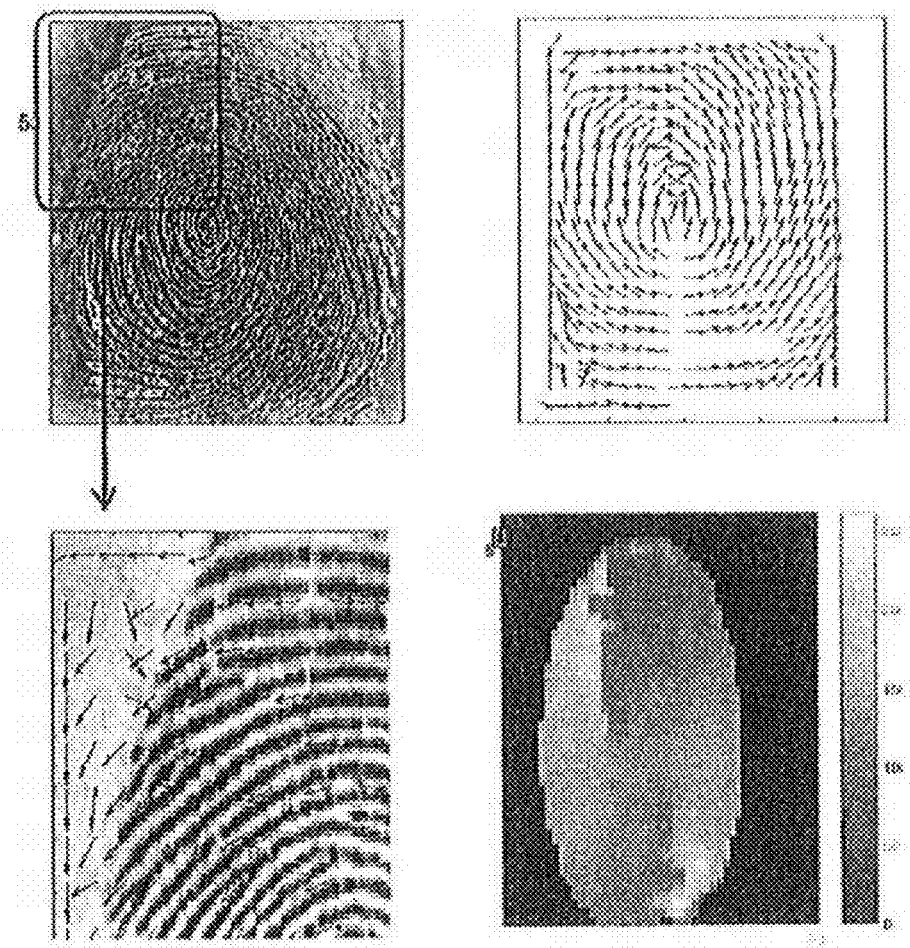
FIG. 7B illustrates extraction of a directional field from a fingerprint image, in accordance with a non-limiting embodiment.
Figure 7C:
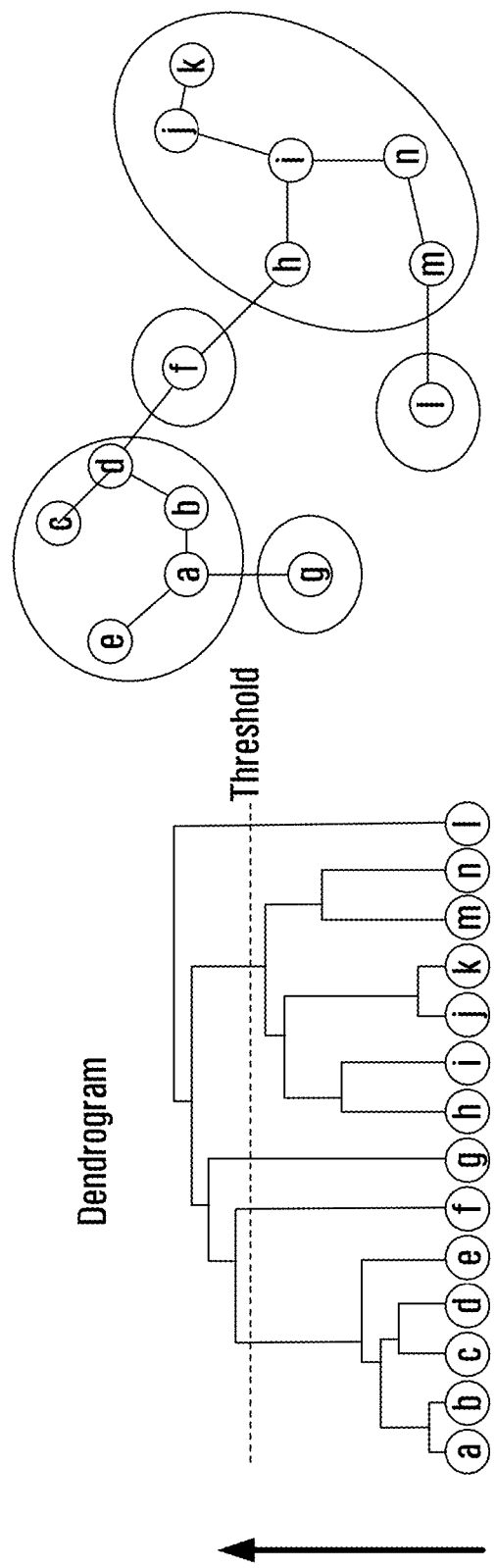
FIG. 7C illustrates operation of a clustering algorithm, in accordance with a non-limiting embodiment.

Regardless of the alignment technique used, the aligned and centered bitmap image may be converted into a directional field by capturing features of the fingerprint image. Due to the fact that a fingerprint image predominantly consists of ridges, a number representing its direction can be assigned to each small area of a fingerprint scan. Thus, the image can be divided into small blocks, yet sufficiently large enough to capture the local direction of the ridges. The direction estimation can be accomplished automatically by the processor, e.g., by a gradient method (based on the application of particular filters such as Sobel, Prewitt or similar filters) or by implementing a 2D FFT (Fast Fourier Transform) algorithm where the direction vector can be estimated in the k-space. FIG. 7B shows the results of this procedure, wherein the top-left window shows the original fingerprint image, the bottom-left and top-right windows show the constructed directional field, and the bottom-right window shows the original fingerprint image converted into an array of small blocks, showing the value (grayscale) of the average angle of the corresponding directional field.

Figure 7D:
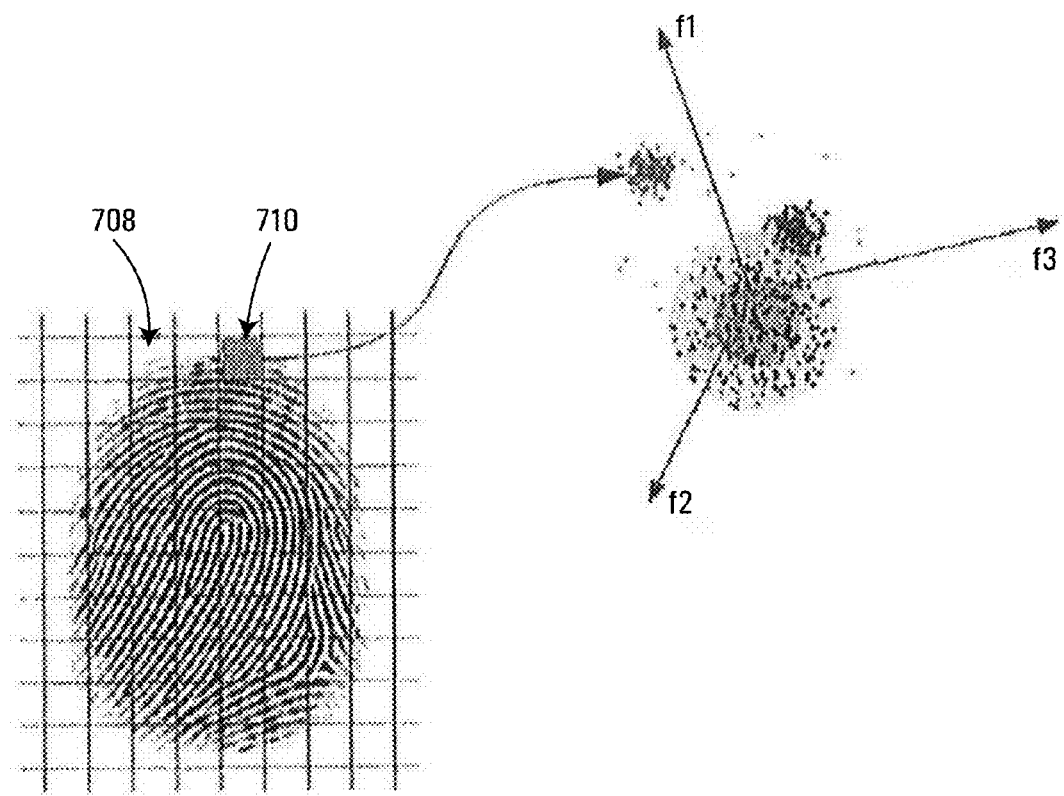
FIG. 7D shows cluster formation in the feature space, in accordance with a non-limiting embodiment.

Next, each initial block of the original fingerprint image is mapped to a "feature space" and a clustering algorithm (hereinafter referred to as a "grouping algorithm" to avoid confusion with clusters 1220, 1320, 1330 as shown in FIG. 13) is applied in the feature space. That is to say, at the beginning of the grouping algorithm, each initial block is considered to be an elementary group and thus there are as many groups as there are initial blocks in the fingerprint image. As schematically shown in FIG. 7D, each of the initial blocks (elementary groups) 710 of the fingerprint image 708 is mapped to the feature space. The feature space refers to one or more parameters used to characterize the group. These parameters may include one or more micro-parameters and/or one or more macro-parameters. An example of macro-parameters (denoted $\{M_k\}$) for a given group may be the number of initial blocks that are inside the given group, the number of initial blocks that were boundary elements, and other parameters that capturing global characteristics. An example of micro- (or local) parameters (denoted $\{m_j\}$) may be connectivity, proximity and relative angle difference between the given element or group and other elements or groups.

A hierarchical grouping method, such as the Lance-Williams algorithm (see "Ward's Hierarchical Clustering Method: Clustering Criterion and Agglomerative Algorithm", in *Journal of Classification*, Volume 31, Issue 3 (2014), hereby incorporated by reference herein), can be applied to the initial blocks (which can also be viewed as consisting of single elements) iteratively by merging them into ever larger groups at each iteration, using the principle of hierarchical agglomerative grouping as shown schematically in FIG. 7C. Agglomeration between two groups occurs when the "distance" (in the feature space) is less than a certain threshold. Specifically, the "distance" in the feature space constitutes an objective function, which incorporates the weighted sum of micro- and macro-parameters. A linear combination of micro- and macro-parameters can be defined as follows:

$$V = \begin{pmatrix} X \\ Y \end{pmatrix}$$

In the above, f is the objective function, are the micro parameters with corresponding weights $\alpha_j$ and $M_k$ are the macro parameters with corresponding weights $\beta_k$. In general, a more complex nonlinear function can be considered as well.

Once an objective function is chosen, the distance between a pair of groups can be determined with the help of Ward's method or similar methods. When the "distance" (i.e., objective function) between two groups is below the threshold, the groups are merged, and the algorithm continues, based on the smaller number of larger groups. The algorithm may be stopped when the remaining number of groups is between 3 and 10, although this range is not to be considered limiting.

A covariance matrix can now be constructed for the data that characterizes the groups in the feature space (which is defined in terms of micro parameters and/or macro parameters). For example, a 6×6 covariance matrix can be constructed with 3 groups and 2 parameters per group. Generally an N×N covariance matrix can be computed based on a 1×N vector whose N elements are micro-parameters or macro-parameters taken from a number of different groups (e.g., P groups and N/P parameters per group). Having constructed an N×N matrix according to this second embodiment, the processor may then proceed to step 530.

At step 530, the processor computes a set of characteristic invariants for the matrix that was computed at step 520. Non-limiting examples of characteristic invariants could include, for example, singular values and eigenvalues and/or a combination thereof such as the determinant and the trace. Computer programs for carrying out singular value decomposition and eigenvalue computations from an input matrix are available from open source libraries implemented in various computer languages or companies such as Mathworks, 3 Apple Hill Drive, Natick, Mass. 01760, USA.

Characteristic invariants have been found to possess the property of being numerically stable across variations/perturbations of the underlying fingerprint image from which they are derived. Such perturbations may arise due to changes in orientation or pressure with which the finger is applied to the platen, changes in the level of humidity of the finger or changes in temperature or blood flow (and other random or quasi-random factors) from one application of the finger to the next. This may lead to displacement of minutia points, disappearance or stray appearance of certain minutia points. However, despite these perturbations in the fingerprint image, the methods proposed herein above produce numerically stable characteristic invariants (e.g., eigenvalues or combinations thereof such as determinant and trace).

By numerically stable characteristic invariants, this may mean that the characteristic invariants will be within a tolerance of E %, F % of the time, where E may be 25, 10, 1, 0.1, 0.01 or even less and F may be 75, 90, 95, 99, 99.9 or even greater when computed for the same finger under different environmental conditions (of temperature, pressure, blood flow, humidity, etc.).

Another way to look at numerical stability in the transformation between minutia points and characteristic invariants is that for changes in the fingerprint image (e.g., changes in the positions of one or more of the minutia points within the fingerprint image) that are likely to occur while the same underlying finger is the source of the image (e.g., not more than an A % change in the position of no more than B % of the minutia), the resultant change in the characteristic invariants is less than A % or B % and/or stays within the above tolerances.

A further way to consider the meaning of numerical stability in the transformation between minutia points and characteristic invariants is that for changes in the fingerprint image that result in not more than an A % change in any one of the weights that represent particular features of the minutiae map (in the first embodiment described above) or not more than a B % change in any one of the micro- or macro-parameters (in the second embodiment described above), the resultant change in the resulting characteristic invariants is less than A % or B % and/or stays within the above tolerances.

The numerical stability of the characteristic invariants arises from several factors, including the eigenvalues' invariance under orthogonal matrix transformations such as rotation and permutations of columns and rows. The presented method allows, in a sense, to abstract oneself from merely the visible features of a given fingerprint image and capture certain inherent features of the underlying finger, which remain common (stable) throughout multiple fingerprint images of that same finger.

Moreover, the matrix from which the eigenvalues are computed captures the main features of a given sample, which are already less subjected to noise factors than the fingerprint image itself, such as false minutia detection at the boundaries, due to the filtering algorithm as shown in FIG. 6B.

Figure 6G:
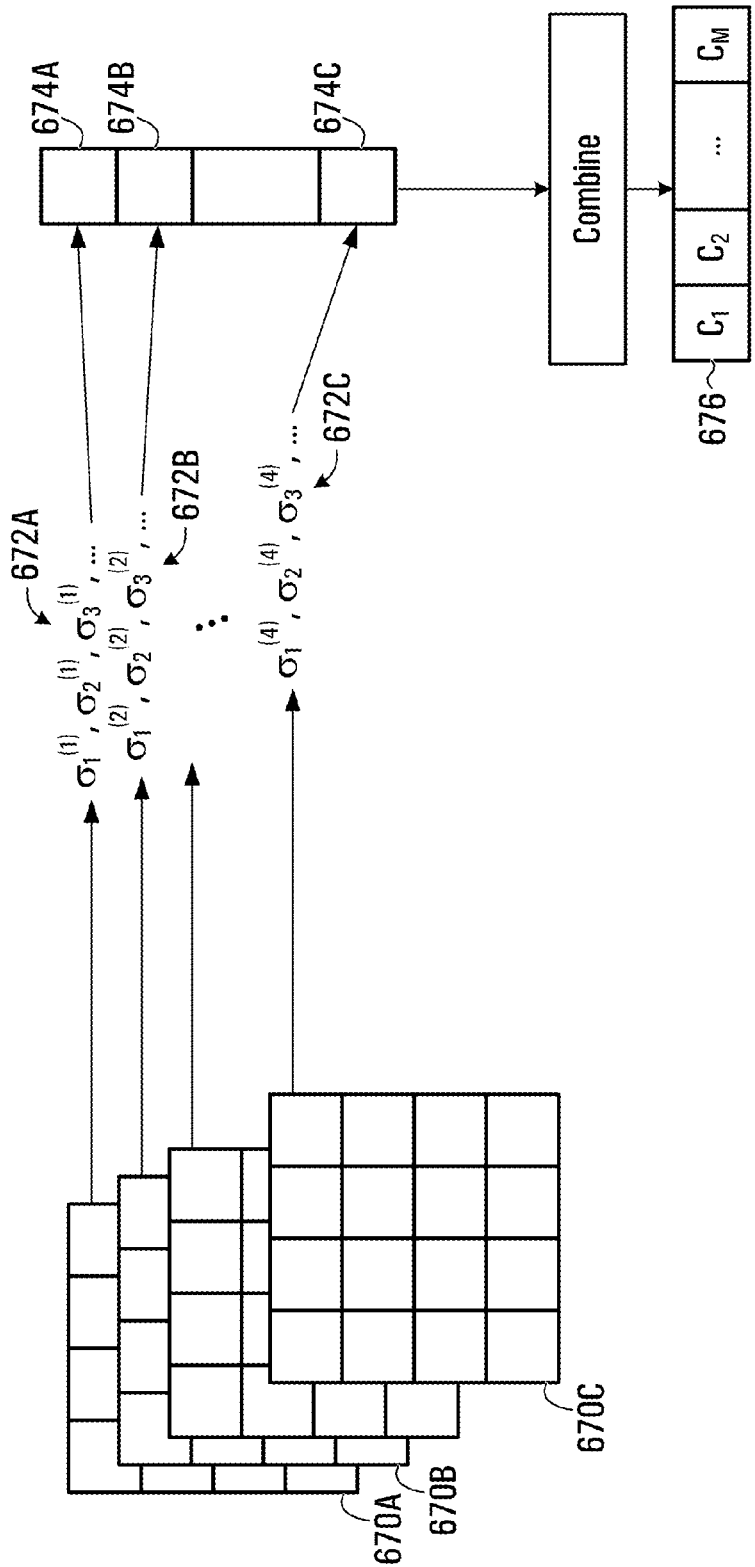
FIG. 6G illustrates creation of a code from characteristic invariants of a plurality of matrixes such as the matrix of FIG. 6D, in accordance with a non-limiting embodiment.

At step 540, the processor creates a code based on the characteristic invariants computed at step 530. This can be done for a plurality of captured fingerprint images of the same finger. For example, FIG. 6G shows a plurality of matrices 670A, 670B, . . . , 670C, a set of characteristic invariants 672A, 672B, . . . , 672C, and the respective resulting code 674A, 674B, . . . , 674C. The resulting codes 674A, 674B, . . . , 674C, obtained from different fingerprint images may themselves be combined into a single code 676 for the finger. Naturally, the generation of a code in this way is a one-way function, as the original fingerprint image cannot be reconstructed from knowledge of the resulting code 676.

In summary, it will be appreciated that the code 676 may comprise an ordered set of M elements $C_1, C_2, \ldots, C_M$, each element being a singular value or eigenvalue of one of the matrices referred to above or one of the micro- or macro-parameters referred to above. The desired value of M (which, it will be recalled, is the dimensionality of both the multi-dimensional data element 201A and the multi-dimensional data element 301A) may vary, and may depend on the application. It should further be appreciated that the value of M need not be identical to the size of the matrices, 670A, 670B, . . . , 670C, which is N×N. For example, if one would like to replace a bank card pin number, M can be as low as 1, 2, or 4, and if a fingerprint is to be used for password generation, it may be beneficial to use 10 or more elements in the code.

In terms of ordering the M elements, when the code 676 includes characteristic invariants (singular values or eigenvalues), the code 676 may include the M largest characteristic invariants in decreasing order of magnitude, for example. In such a scenario, knowing that the larger characteristic invariants are the more stable ones, lowering the value of M produces a more stable code 676.

It will be appreciated that for a given matrix constructed in one of the non-limiting example ways described at step 520, the characteristic invariants (singular values and/or eigenvalues and/or functions thereof) obtained at step 530 remain numerically stable or even constant, even if the fingerprint image from which the underlying matrix is derived is perturbed. Of course, the more invariant or numerically stable the characteristic invariants, the more invariant or numerically stable the resulting code will be. Additional stability, gained at the expense of discrimination power, is achieved by limiting the number of significant digits of the characteristic invariants.

Examples of perturbations between two fingerprint images that produce characteristic invariants that lead to the conclusion that the underlying fingers are the same may include, to name a few non-limiting possibilities: a maximum absolute or percentage change in terms of the number of minutia points in the fingerprint image, a maximum absolute or percentage change in the position (in one or more directions) of one or more (or a maximum number of) minutiae, a maximum absolute or percentage change in terms of the distribution of different types of minutia points, etc. Each of these scenarios may cause the resulting codes to exhibit the sought-after numerical stability, thereby allowing and authentication with low rates of false negatives and false positives.

To facilitate visualization of the notion of stability, reference is made to FIG. 13, wherein it is noticed that higher stability will manifest itself through denser clusters in the space of characteristic invariants.

Figure 14:
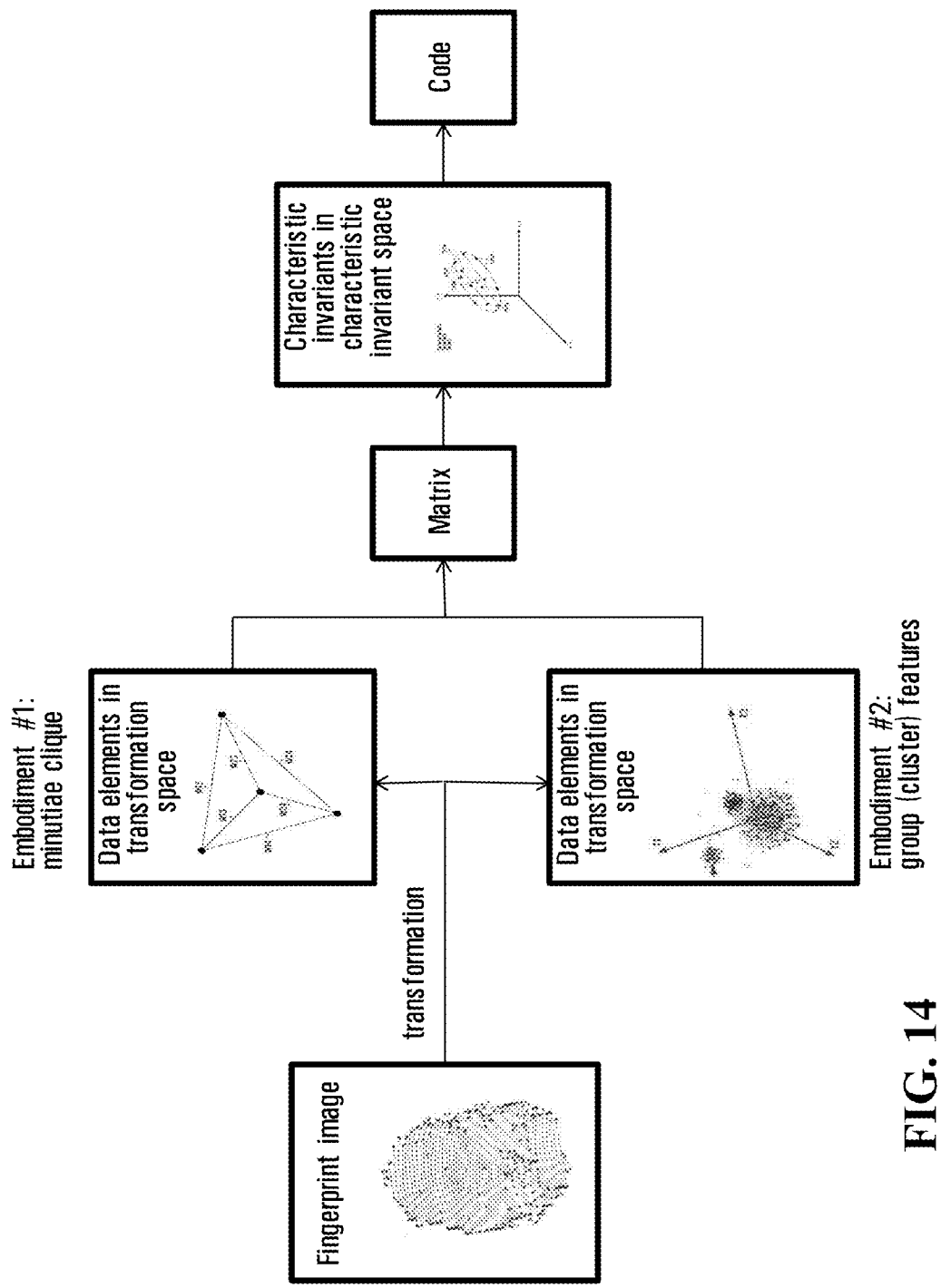
FIG. 14 illustrates two approaches to generation of a code from a fingerprint image using characteristic invariants.

The above description can be recast with reference to FIG. 14, in which the fingerprint image undergoes a transformation into a set of data elements in a "transformation space" (also referred to as "transformation space data elements"). The transformation (and the nature of the transformation space) depends on the embodiment. For example, in one embodiment, the "transformation" involves the removal of removes falsely detected or unstable points to produce a resulting minutia map and associated clique. (The "transformation space" is in this case a two-dimensional minutia map.) In another embodiment, a hierarchical grouping method (clustering algorithm) is performed to end up with a limited number of groups having a certain number of properties. (The "transformation space" is in this case a feature space that depends on the parameters used to calculate an objective function used by the hierarchical grouping algorithm.) In either case, an N×N matrix is formed and characteristic invariants (e.g., eigenvalues) are obtained, and then a subset of M eigenvalues (e.g., the M largest in decreasing order) can be selected, resulting in creation of the multi-dimensional data element (code).

The above description involved computation of characteristic invariants of a matrix to obtain the multi-dimensional data elements 201A and 301A. In other embodiments, the multidimensional data elements 201A and 301A may be generated from the underlying fingerprint image without obtaining the characteristic invariants of a matrix. For example, the aforementioned macro-parameters (such as the number of elements inside the cluster, the number of boundary elements, the ratio between the number of boundary elements of a cluster and its total number of elements, etc.) may be used directly as part of the resulting code. The micro-parameters may similarly be used in other embodiments. If the multi-dimensional data element created consists of parameters that are taken on a per group basis, then a certain ordering of the groups may be preferred. This can be done by ordering groups in terms of their size, distance from a center point, etc., so that consistent results are obtained for the same finger when presented for scanning on two different occasions.

Figure 8A:
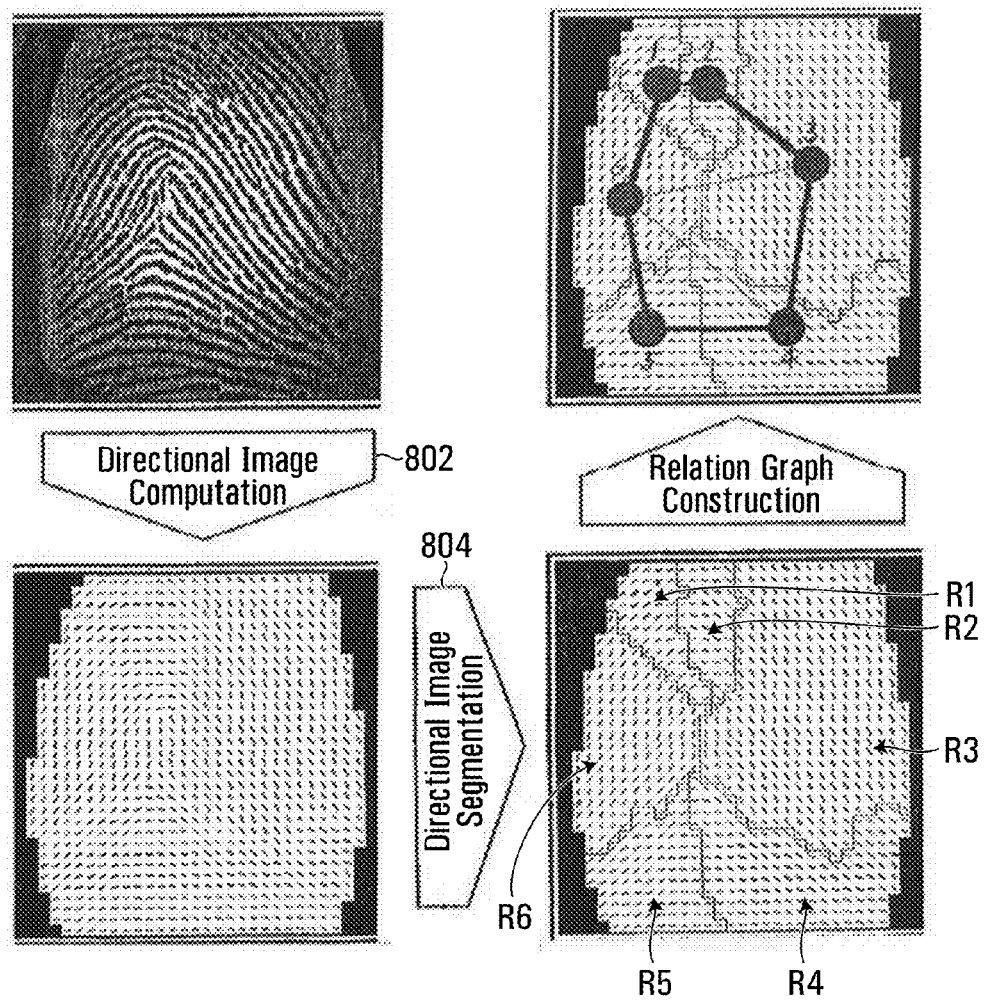
FIGS. 8A and 8B conceptually show directional image computation and directional image segmentation, in accordance with a non-limiting embodiment.
Figure 8B:
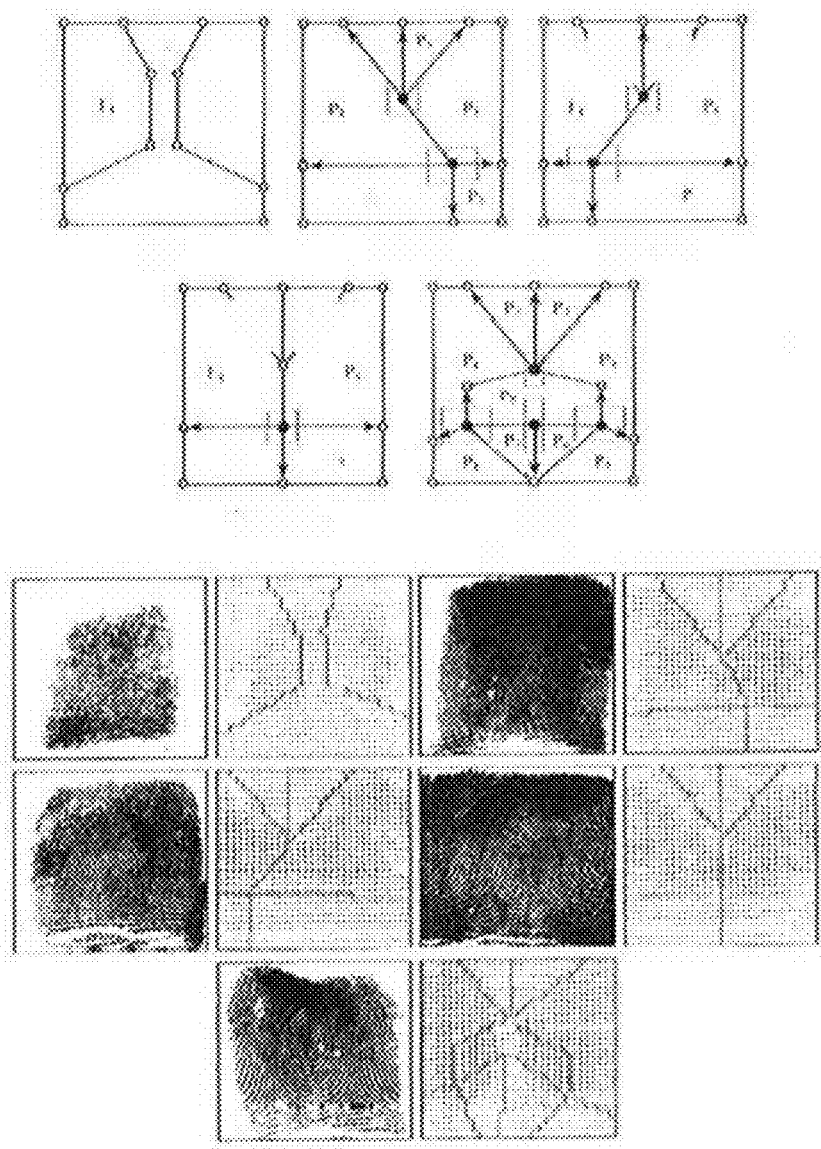
Figure 8C:
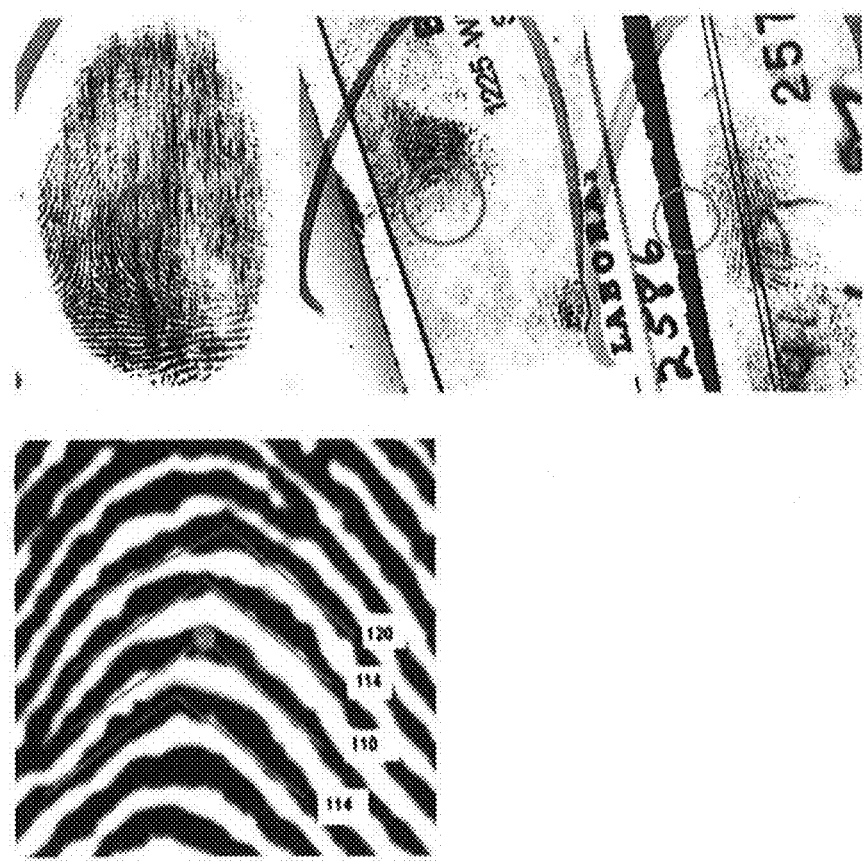
FIG. 8C shows different ridge angles that appear in an actual fingerprint image.

IV. Generation of a Multi-Dimensional Data Element from a Fingerprint Image (for Enrollment Phase and Identification Phase)—Directional Image Approach Still further embodiments exist for generating multi-dimensional data elements 201A and 301A from a fingerprint image (steps 230 and 330) without relying on the computing of characteristic invariants of a matrix. With reference to FIGS. 8A to 8C, a possible approach uses a fingerprint directional image, which is a matrix whose elements represent the direction of the tangents to the fingerprint ridge lines. A non-limiting example approach utilizes gradient computation, as described in Maio and Maltoni ("A Structural Approach to Fingerprint Classification", in *Proceedings of the* 13*th International Conference on Pattern Recognition, volume C*, (1996)), hereby incorporated by reference herein. Next, segmentation is aimed at partitioning the directional image into regions containing elements with similar directions and having regular shapes. The fingerprint directional image is segmented in regions by minimizing the variance of the element directions within the regions. The chosen segmentation will be the one that minimizes a specially defined total cost function.

With reference therefore to FIG. 8A, there is shown directional image computation 802 and directional image segmentation 804, both of which can be implemented by the processor. Specifically, the regions of the segmented directional image are labelled, starting from the top left corner as Region 1 and the next one in the clockwise or counter clockwise direction as Region 2, etc., until the last one is reached (in this case, Region 6). The "Border Data Field" is determined by the numbers of the two regions where the longest (and/or the shortest) border crossing lies, in order of, e.g., clockwise (or counter-clockwise) rotation from Region 1 to Region R. The length of the border between Regions i and j is designated as B(i,j). In the illustrated example:

B(1,2)=48 units
B(2,3)=34 units
B(3,6)=23 units
B(3,4)=92 units
B(4,5)=42 units
B(5,6)=49 units
B(6,1)=49 units where the choice of the unit can be arbitrarily taken, e.g., 1 mil or 1 millimeter. In clockwise order, the shortest border crossing is between Regions 2 and 3, and the longest border crossing is between Regions 3 and 4. As a result, one can create an invariant, fixed-value index by concatenating the numbers of the regions having the shortest and longest border crossings to give a multi-element "border data code", namely, in this example, 2334. In one embodiment by "fixed" is meant in variant under different samplings of the finger, most of the or at least X percent of the time where X can be 75, 90, 95, 99 or greater. Such an approach may be particularly useful if the number of regions is kept to less than 10 so that single digits can be used to represent individual regions, although when the number of regions exceeds 10, it is possible to use hash functions, for example, to reduce the number of digits needed to represent a region.

In some cases of fingerprints, e.g., arch class fingerprints, there may be a very small number of regions (e.g., 3) and this may not constitute a sufficient number of regions to create a meaningful code. One can deal with this situation by adding a number of zeros in the least significant digit positions.

When the above approach is not expected to provide a high degree of identification power, a greater ability to discriminate among multiple users may be provided by considering area data field constructions. Specifically, consider the normalized area of each chosen region (i.e., the percentage area), truncated to a certain number of digits. The units used to compute the area may be selected as desired, e.g., as the gradient lines shown in the bottom-left and bottom-right windows of FIG. 8A. Then, by concatenating the (e.g., two-digit) normalized areas (e.g., percentages) from multiple regions, one may forms a multi-element "area data code" that is "quasi-invariant". Of course, any number of elements, with any number of digits per element, may be used in the quasi-invariant area data code. By being "quasi-invariant" the area data code is expected to vary to a certain degree with factors (such as temperature, pressure, blood flow, humidity, etc.) across multiple samplings of the same finger, although perturbations are negligible. By perturbations being negligible, this may mean that the perturbations are within a tolerance of X %, Y % of the time, where X may be 10, 1, 0.1, 0.01 or even less and Y may be 90, 95, 99, 99.9 or even greater when the same finger is used under different environmental conditions (of temperature, pressure, blood flow, humidity, etc.). Conversely, variations in the area data code that are within a certain tolerance are then taken as an indication of the same finger having been used to create the area data code, i.e., when the finger of a query user who is a reference user is tested against the finger of that reference user, there will be no difference between the area data codes or there will be a difference that falls within a predefined tolerance.

The quasi-invariance of the area data code of course does not apply when a different finger (e.g. that of an impostor) is analyzed, since the variations will be so great that even the border data code will almost certainly change, leading to fewer false positives i.e. fewer instances of an imposter being given access to a legitimate user's account or privileges.

In terms of a predefined acceptable tolerance between two area data codes originating from the same finger, this could be defined as a maximum allowable percentage or maximum allowable absolute change in the values of the individual elements that make up the each area data code.

In another embodiment, this could be a maximum Euclidean distance between points in N-dimensional space. In this context the N-dimensional space can be contracted by assigning the spatial axes to particular areas and defining the scalar product in this space with regards to the obtained covariance matrix, obtained after analyzing measured data points. For example, let us say one obtains a fingerprint image. This image can be viewed as a point or a vector in N-dimensional space, where in the above context N is the number of areas. For a particular system one knows from experiments the acceptable variance in measurements, let it be say $\sigma=3$, thus if the deviation between from the centre of particular user cluster and a particular measurement is less than the acceptable variance, the fingerprint is positively identified.

Still other definitions of a predefined acceptable tolerance may be contemplated by those of skill in the art. For example, consider a six-region fingerprint image starting Region 1 from the left top of the image, and go clockwise to Region 2 and end up with Region 6 adjacent to Region 1. If area of a region is expressed as a percentage of the sum total of all the regions, starting with area of Region 1=06 (i.e., 6 percent) and ending with area of Region 6=17 (i.e., 17%), one obtains an area data code given by [06 06 41 19 11 17]. On a second trial, a second area data code from the same finger may appear as [06 07 38 16 13 20]. One can draw the conclusion that there is less than 20% tolerance between two corresponding 5th field contents namely 11 on top and 13 at the bottom—the worst case. Once the tolerance between fields is fixed, one can resort to any majority decision logic such as a ⅔ rule to define similarity so that if four out of six fields are matched to within the 20% tolerance, the two codes are declared matched.

A quasi-invariant "compound code" may also be constructed by concatenating the border data code (which may be fixed) and the area data code (which may be quasi-invariant). In particular, the compound code will include a first portion (the border data code) that is fixed or highly invariant across multiple samplings of the same finger, irrespective of the aforementioned factors such as temperature, pressure, blood flow, humidity, etc. A second portion of the compound code (the area data code) is expected to vary to a certain degree with the aforementioned factors across multiple samplings of the same finger, although perturbations will be machine recognizable. For example, false ridges exist as irregular fine lines between the normal friction ridges. This unusual epidermal formation can be recognized in most cases. First, it does not contain any sweat pores. Second, the fine skin protrusions do not usually have the width of the normal ridges. Third, in most cased the ridges appear broken. Other types of degradation associated with fingerprint images are not well separated parallel ridges, cuts, creases, and bruises. Signal conditioning can be applied to enhance and to improve the clarity of the ridge structure in the recoverable regions of the fingerprint and mask the unrecoverable regions, thereby reducing the sources of perturbation.

A further code can be obtained using the ratio of border length (as described above) to "core height". As described above, the border length is the length of a border crossing between two regional areas on a fingerprint directional image. The core height is the distance of the core point of a fingerprint to the first flexion crease of a fingertip. This ratio normalizes a border crossing length using the core height as the denominator. By taking a certain number of significant digits of this ratio as a percentage number (e.g., 41.6% written as 416), a user can use this 3-digit number as a shared secret. Agreement on which border crossing is to be used may be achieved by having properly rotated the fingerprint image in 2-D space and selecting a specific border crossing involving a regional area occupying a specific position within the rotated and aligned image. Alternatively, the longest (or second-longest, or shortest, etc.) border crossing may be used.

The border length-to-core-height ratio is a near constant number when the same finger is being considered. In particular, a user can be authenticated by a Web server authenticator by submitting a certain number (e.g., 8) replicates of his "border-length-to-core-height-ratio" upon request, for verification during the identification phase. This allows the server to perform a test (such as the Wilcoxon signed rank test, also referred to as the Wilcoxon paired-sample test) to determine if the null hypothesis can either be rejected or accepted. The use of this ratio for high-security authentication may benefit from the embedding of a high power miniature processor into the scanner machine.

One advantage of using the first flexion crease in computing the "core height" is that it does not leave a latent print behind to be forged. This is because there are no sweat pores on the crease line. Using the first flexion crease line as a vector pointing "east", one can easily create a north-pointing vector for the directional image map, independent of rotation, translation or scaling. Detection of the first flexion crease at the first finger joint is done under bright field illumination. There can be two light sources, or one light source splitting into two light beams as shown in FIG. 1A of U.S. Pat. No. 7,327,859 to Lam Ko Chau, incorporated by reference herein. A dual-field scanner may be used for this purpose, i.e., dark field for image acquisition and bright field for capturing the first flexion crease.

V. Modification of Multi-Dimensional Data Element 301a for Added Security

Figures 9, 10:
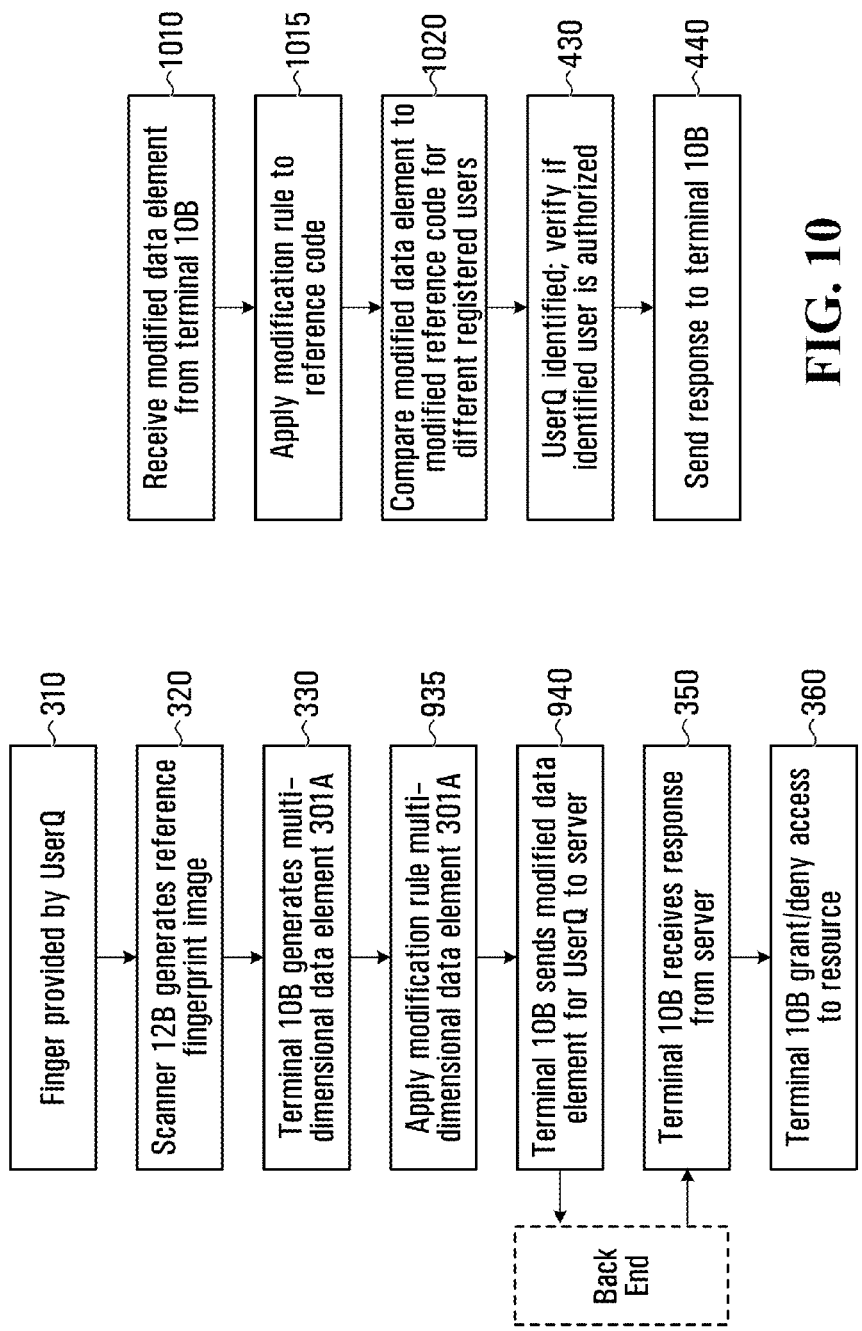
FIG. 9 is a variant of FIG. 3A.
FIG. 10 is a variant of FIG. 4A.

In a variant of the above embodiments, and with reference to FIG. 9, consider the identification phase in which steps 310-330 are performed as before, except that there is an additional step 935, whereby, prior to transmission to the server 18, the multi-dimensional data element 301A is modified in accordance with a specific "modification rule" to yield a modified data element. In an example of the modification rule, consider an initial multi-dimensional data element 301A generated from UserQ's fingerprint image at step 330. Scanner 12B and/or terminal 10B obtains "modification information". The modification information is then used to inform the modification rule, which then applies a modification to the multi-dimensional data element 301A, resulting in a change in the number and/or order of the terms in the resulting modified data element. In a non-limiting embodiment, the modification rule could simply involve reducing the number of terms in the multi-dimensional data element 301A, which then becomes the modified data element. Other examples of the modification rule applied to the multi-dimensional data element 301A include the modification or deletion of 1 or more terms, the permutation of two or more terms, the shifting of terms to the right or left, etc. The modified data element is sent to the server at step 940.

Then, at the server 18, and with reference to FIG. 10, instead of comparing the multi-dimensional data element 301A to a particular reference cluster, it is the modified data element that is compared to a modified version of the reference code 201 for the particular reference cluster at step 1020. It is recalled that the reference code 201 for the particular reference cluster may be a central point of the particular reference cluster, for example. The modified reference code would then be obtained at step 1015 from the (original) reference code 201 by applying the same modification rule (and using the same modification information) as was applied to the (original) query code in order to obtain the modified data element at step 935.

Since the modified data element is obtained from the (original) reference code 201 by applying the same modification rule (and using the same modification information) as is to be used to obtain the modified data element from the original multi-dimensional data element 301A, this means that the modification information should remain constant between the enrollment phase and the identification phase. To this end, the modification information may be obtained by terminal 10A from the user during the enrollment phase (e.g., further to a prompt from terminal 10A and/or scanner 12A), and this user-inputted modification information may be directly communicated to the server 18 over the secure link 50 so that it can be used by the server 18 later during the identification phase. In another example, the modification information is in a form whereby it is computable by the server 18 based on an algorithm that produces a result that UserQ is also aware of. In other words, the modification information is a shared secret between UserQ and the server 18 (assuming UserQ is a registered user), without involving terminals 10A, 10B or scanners 12A, 12B.

Figure 11:
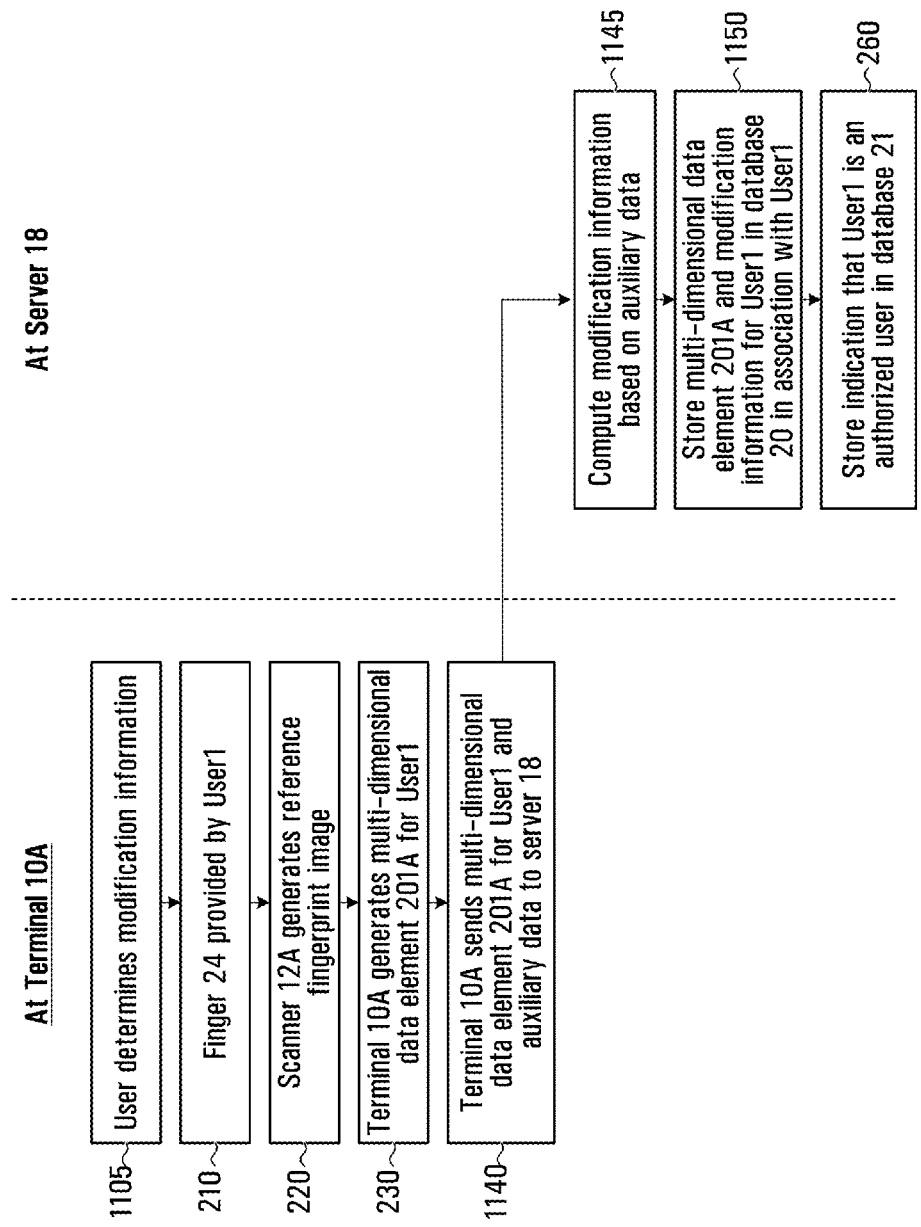
FIG. 11 is a variant of FIG. 2.
Figure 12:
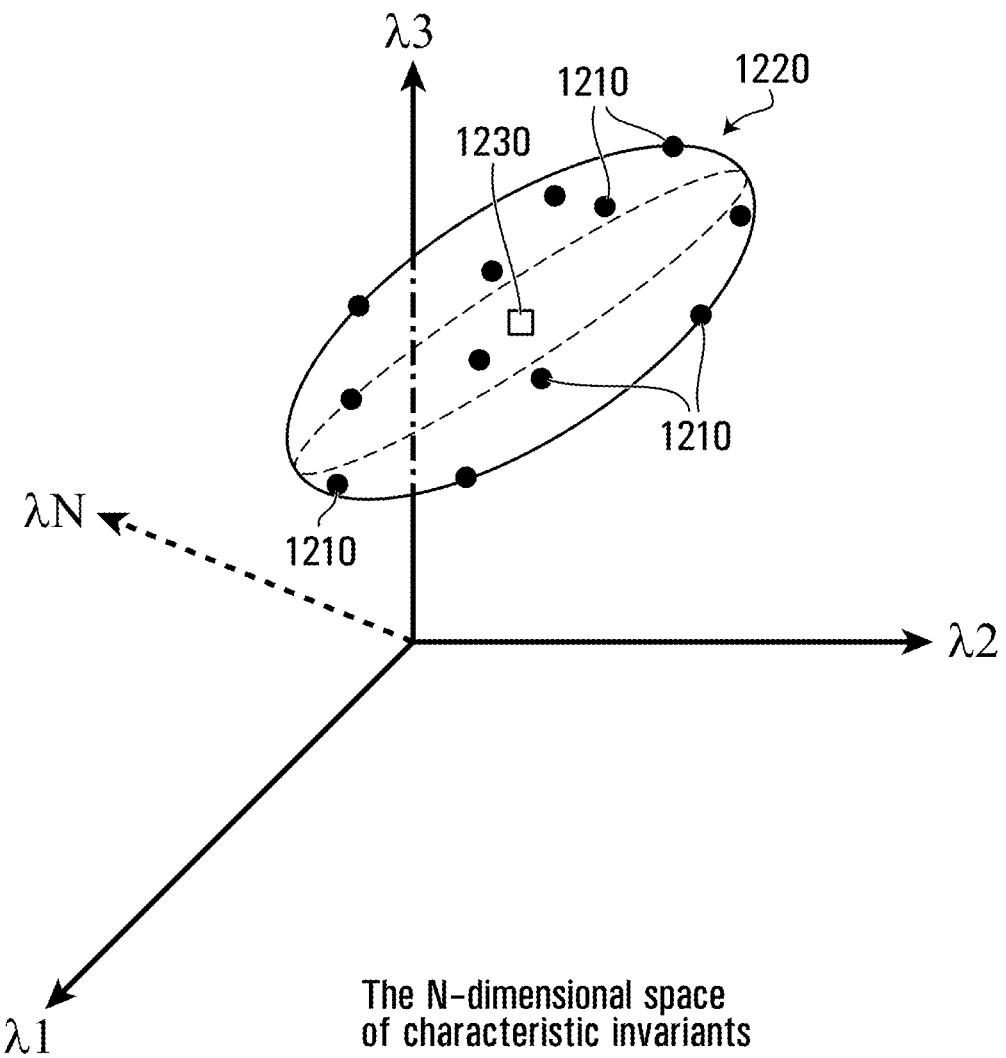
FIG. 12 shows how a cluster may be defined in the space of characteristic invariants.

For example, consider an algorithm whereby the server 18 determines the day of the week based on the current time and location data (e.g. GPS data). This day of the week need not be "computed" by UserQ because it is known to him/her (e.g., by looking at his/her smartphone). As such, the modification information can be the day of the week, codified to a number between 1 and 7, inclusively. During the enrollment phase, therefore, and as shown in FIG. 11 at step 1105, UserQ determines that the modification information is the current day of the week (e.g., 1 for Monday, 2 for Tuesday, etc.). The current time and GPS data forms part of the additional information that is sent by terminal 10A to the server 18 at step 1140, and the server 18 computes the modification information (current day of the week at the user's location) at step 1145, resulting in the same information as in the hands of the user. This day of the week (codified alphanumerically) can be stored in the database 10 in association with the information for the user in question at step 1150.

Then, during the identification phase, which can take place at a different time (and on a different day of the week), the user is prompted for the modification information and will enter the digit from 1 to 7 that was previously in effect during the enrolment phase. This information is used by terminal 10B/scanner 12B to create the modified data element at step 935, which is forwarded to the server 18. In order to carry out its comparison, the server 18 now needs to know how to modify its reference code 201 for User1 (as well as other reference codes for other users) in order to effect the proper comparison with the modified data element received from terminal 10B. To this end, the server 18 accesses the database and obtains the modification information (codified day of the week), and applies the modification rule (at step 1015), informed by the modification information, to create one or more modified reference codes for comparison purposes.

It is noted that at terminal 10B used in the identification phase, only the modification rule and the way that the modification rule is informed by the modification information are needed. Whether the user is supplying the correct modification information (or modification information that is sufficiently correct to lead to a positive ID) is up to the server 18 to determine.

By way of non-limiting example, suppose that one has the following scenario:

| | |
|---|---|
| Reference code 201 (at server 18): | 13 62 87 20 36 42 57 91 |
| Modification rule = delete X fields and shift right Y times | |
| Modification information: X = {2, 7}; | |
| Y = {2} as shared secret between user and server only | |
| Deletion of fields 2 and 7: | 13 [. . .] 87 20 36 42 [. . .] 91 |
| Result of deletion: | 13 87 20 36 42 91 |
| Result of shifting the result twice: | 42 91 13 87 20 36 |
| Modified reference code (at server 18): | 42 91 13 87 20 36 |

Of course, persons skilled in the art will contemplate numerous variations of the above, including more complex ways of coming up with the shared secret between the user and the server 18, more complex modifications (other than a single-field delete or multiple-field delete and shift) and still other algorithms for computing the modification information from external data. Each such variation is included herein as a non-limiting embodiment of the present invention.

Naturally, the terminals 10A, 10B may be equipped with additional mechanisms to enhance security, such as deletion of the fingerprint image after extracting the attributes of the fingerprint.

It is noted that if the database 20 contains of the M-element reference code 201 for User1, and if the modification rule were defined by the deletion of a single element from one of 7 positions (M greater than or equal to 7), then even if a hacker were to steal the reference code 201 for User1 from the server 18, it would only give that hacker a one-in-seven chance to successfully fool the system 1 into falsely authenticating the hacker as User1 because when submitting the modified data element, the hacker would have to guess how the reference code 201 for User1 should be modified so that the correct modified data element is submitted to the server in a subsequent identification phase. Not to mention, the hacker would need to know that the modification is a single-field delete in this case.

In an alternative embodiment of the identification phase, the modification information comprises a word N1, known to the server 18 (and the user) in advance (i.e., N1 is a shared secret/private key). During the identification phase, the end device (terminal 10B or scanner 12B) generates an authentication parameter N2, which can be derived from one or more of a current date, device information (serial number, device location, etc.) Next, the end device (scanner 12B or terminal 10B) can generate a number N3 (e.g., from 0 to 7 or any other range of numbers) by processing, in conjunction, the shared secret N1 and the authentication parameter N2. This can be done according to an algorithm involving N1 and N2, thereby resulting in N3, which is the modification information codifying the field/term/element which should be excluded from the multi-dimensional data element 301A when generating the modified data element. For example, a trivial case of the algorithm could be $N3=mod_8(N1+N2)$. The use of a one-way function, such as modulo 8 in this case, means that even if the modification information (N3) is intercepted, there is no way to recover the secret word N1, which will in all likelihood result in a different value of N3 the next time it is used (e.g., at a different scanner or on a different day etc.).

At the server 18, the modified data element (with one or more fields excluded, shuffled, etc. according to the modification rule informed by the modification information N3) is received. The server 18 has knowledge of the secret word N1 of each user. In addition, the server 18 knows N2 because it has information (e.g., IP address, serial number, date, etc.) of the end device (scanner 12B or terminal 10B). As such, the server 18 can generate N3 using the same algorithm (known in advance) and therefore N3 can be used as the modification information that informs the modification rule that is applied to the reference code 201 (and other reference codes) stored in the database 20, in an attempt to identify UserQ from among the users whose records are in the database 20.

In an embodiment of the above variant, it should be appreciated that a pre-processing step may be performed in order to render the above process more computationally efficient. In particular, in the above example, since the number of possible values of N3 is limited (to 8 in this case), it is possible to calculate all possibilities of each modified reference code, thus creating a "range" of modified reference codes for each registered user. This means that a straightforward comparison can be done in parallel with multiple pre-generated modified reference codes, i.e. modified reference codes that have been pre-generated (for the various possible values of N3). Naturally, there is a chance that more than one match occurs, but this would be handled by the fact that N2, obtained from user terminal 10B, would then be combined with the shared secret (N1) for each registered user (stored in the database 20) in order to obtain N3, which could then be compared, for a particular matching pre-generated modified reference code for that user, with the value of N3 that had been used to generate the particular pre-generated modified reference code, thereby to see if a match still occurs.

Of course, the above processes can be applied to any finger and/or to more than one finger, so as to provide further increased security for each registered user.

One of ordinary skill in the art would also understand that certain embodiments of the system 1 may work with other biometric indicators of a user other than fingerprints, including, but not limited to: face recognition, iris scans, palm prints, voice signatures, and/or signature comparison.

Those skilled in the art will appreciate that in some embodiments, elements of the system 1 may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the elements of the system 1 may be implemented using pre-programmed hardware or firmware elements (e.g., application specific integrated circuits (ASICs), electrically erasable programmable read-only memories (EEPROMs), flash memory, etc.), or other related components.

It should also be appreciated that in some embodiments, all or part of the elements of the system 1 can be manufactured based on a low-level hardware description obtained using a logic synthesis tool that is run on a computing device. The logic synthesis tool is configured to read source code containing a functional description of the elements of the system 1 e.g., in a language such as HDL, VHDL, Verilog) and to output a definition of the physical implementation of a circuit suitable for implementing corresponding functionality.

In the examples described above, the device, elements [and circuits] are connected to each other as shown in the figures, for the sake of simplicity. In practical applications of the present invention, elements, circuits, etc. may be connected directly to each other. As well, elements, circuits etc. may be connected indirectly to each other through other elements, circuits, etc., necessary for operation of the devices or apparatus. Thus, in actual configuration, the devices, elements and circuits are directly or indirectly coupled with or connected to each other.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

The invention claimed is:

1. A computer-implemented method of transforming a fingerprint image into a code, comprising:
    obtaining a fingerprint image;
    creating a features map from the fingerprint image, the features map including at least a certain number N of minutiae;
    creating an N×N matrix in which each row and each column corresponds to a particular one of the N minutiae, wherein the diagonal element of a particular row represents a property of the corresponding particular minutia and wherein the off-diagonal element in a certain row and column represents a joint property of the pair of particular minutiae corresponding to the certain row and column;
    computing a set of at least one characteristic invariant of the matrix; and
    setting the code to include at least one of the characteristic invariants.

2. The method defined in claim 1, further comprising setting the code to include a predefined number of the largest characteristic invariants in the set.

3. The method defined in claim 2, wherein the joint property includes at least one angle.

4. The method defined in claim 2, wherein the joint property includes at least one distance.

5. The method defined in claim 1, wherein the at least one characteristic invariant comprises an eigenvalue.

6. The computer-implemented method defined in claim 1, wherein the property of the corresponding particular minutia comprises a distance from the particular minutia to a "center of mass" of a set of minutiae in the fingerprint image.

7. The computer-implemented method defined in claim 1, wherein the property of the corresponding particular minutia comprises an angle from the particular minutia to a "center of mass" of a set of minutiae in the fingerprint image.

8. The computer-implemented method defined in claim 1, wherein the property of the corresponding particular minutia comprises a code corresponding to a minutia type of the particular minutia.

9. The computer-implemented method defined in claim 1, wherein the joint property comprises an angle of an edge joining the pair of minutiae, relative to a reference angle.

10. The computer-implemented method defined in claim 1, wherein the features map comprises a clique with vertices represented by the N minutiae.

11. The computer-implemented method defined in claim 1, further comprising carrying out said steps of obtaining, creating, creating and computing for each of a plurality of fingerprint images from the same finger in order to obtain a corresponding plurality of sets of at least one characteristic invariant; wherein setting the code to include at least one of the characteristic invariants comprises setting the code to include at least one characteristic invariant from each of the sets.

12. The computer-implemented method defined in claim 1, wherein setting the code to include at least one of the characteristic invariants comprises applying a one-way function.

13. The computer-implemented method defined in claim 1, the fingerprint image being associated with a user, the method further comprising updating a reference cluster for the user in a space of characteristic invariants to include said code.

14. The computer-implemented method defined in claim 13, wherein updating the reference cluster for the user in the space of characteristic invariants to include said code comprises replacing with said code at least one previous member of the reference cluster having an older time stamp than said code.

15. The computer-implemented method defined in claim 14, wherein updating the reference cluster for the user in the space of characteristic invariants to include said code comprises replacing with said code at least one previous member of the reference cluster having a distance, within the space of characteristic invariants, from a center of mass of the reference cluster that is further than the distance from said center of mass to said code.

16. The computer-implemented method defined in claim 13, further comprising determining an identity of the user before said updating.

17. The computer-implemented method defined in claim 1, wherein the property and the joint property are respective micro-parameters that characterize the features map of minutiae.

18. The computer-implemented method defined in claim 1, wherein the property of the corresponding particular minutia comprises a direction angle of the particular minutia.

19. The computer-implemented method defined in claim 1, wherein the joint property comprises an angle between the pair of minutiae, relative to a reference angle.

20. A computer-implemented method of fingerprint-based identification, comprising:
  obtaining a fingerprint image;
  creating a features map from the fingerprint image, the features map including at least a certain number N of minutiae;
  creating an N×N matrix in which each row and each column corresponds to a particular one of the N minutiae, wherein the diagonal element of a particular row represents a property of the corresponding particular minutia and wherein the off-diagonal element in a certain row and column represents a joint property of the pair of particular minutiae corresponding to the certain row and column;
  computing a set of at least one characteristic invariant of the matrix; and
  determining whether the fingerprint image is positively associated with a known user by comparing certain ones of the computed characteristic invariants with characteristic invariants previously associated with the known user;
  concluding whether the particular known user is associated with the fingerprint image based on the comparing.

* * * * *